US012630405B2

(12) United States Patent
Ishiguro et al.

(10) Patent No.: US 12,630,405 B2
(45) Date of Patent: May 19, 2026

(54) MANUFACTURING SYSTEM

(71) Applicants: Toyo Seikan Co., Ltd., Tokyo (JP); Toyo Seikan Group Holdings, Ltd., Tokyo (JP)

(72) Inventors: Hideki Ishiguro, Tokyo (JP); Seitarou Kanazawa, Kanagawa (JP); Tomohiko Nakamura, Kanagawa (JP); Tsutomu Murayama, Saga (JP); Jun Sudo, Tokyo (JP)

(73) Assignees: Toyo Seikan Co., Ltd., Tokyo (JP); Toyo Seikan Group Holdings, Ltd., Tokyo (JP)

( * ) Notice: Subject to any disclaimer, the term of this patent is extended or adjusted under 35 U.S.C. 154(b) by 127 days.

(21) Appl. No.: 18/148,479

(22) Filed: Dec. 30, 2022

(65) Prior Publication Data

US 2023/0135918 A1 May 4, 2023

Related U.S. Application Data

(63) Continuation of application No. PCT/JP2021/025051, filed on Jul. 1, 2021.

(30) Foreign Application Priority Data

Jul. 22, 2020 (JP) ................................ 2020-125756

(51) Int. Cl.

*B67C 7/00* (2006.01)
*B65C 3/08* (2006.01)
*B67C 3/00* (2006.01)

(52) U.S. Cl.

CPC ................ *B67C 3/007* (2013.01); *B65C 3/08* (2013.01); *B67C 7/00* (2013.01)

(58) Field of Classification Search

CPC . B67C 3/007; B67C 2003/227; B67C 7/0013; B29C 49/78; G05B 19/4189

See application file for complete search history.

(56) References Cited

U.S. PATENT DOCUMENTS 9,073,251 B2 * 7/2015 Hahn .................. B29C 49/6409
9,302,802 B2 * 4/2016 Piana ...................... B67C 3/007

(Continued)

FOREIGN PATENT DOCUMENTS

JP S5567698 U 5/1980
JP H05253810 A 10/1993

(Continued)

OTHER PUBLICATIONS

International Search Report and (ISA/237) Written Opinion of the International Search Authority for International Patent Application No. PCT/JP2021/025051, mailed by the Japan Patent Office on Sep. 21, 2021.

(Continued)

*Primary Examiner* — Andrew M Tecco

(57) ABSTRACT

A manufacturing system including a container manufacturing line for manufacturing a container, and a filling line for filling the container with a filler is provided. The container manufacturing line is coupled to the filling line, and the container manufactured in the container manufacturing line is supplied to the filling line. The container manufacturing line may include a first speed control unit for controlling a manufacturing line speed depending on a filling line speed of the filling line. The first speed control unit may change the manufacturing line speed of the container manufacturing line depending on a change in a number of containers in a predetermined process of the filling line.

18 Claims, 18 Drawing Sheets

(56) References Cited

U.S. PATENT DOCUMENTS

| | | | | |
|---|---|---|---|---|
| 9,375,878 | B2 * | 6/2016 | Hahn | B65C 9/40 |
| 10,017,288 | B2 * | 7/2018 | Bockisch | B65B 57/20 |
| 10,125,001 | B2 * | 11/2018 | Führer | B67C 3/007 |
| 10,384,818 | B2 * | 8/2019 | Ehmer | B65B 57/04 |
| 10,450,179 | B2 * | 10/2019 | Sorbi | B29C 49/42069 |
| 10,913,646 | B2 * | 2/2021 | Clüsserath | B67C 3/007 |
| 11,698,629 | B2 * | 7/2023 | Pasquier | G05B 19/4189 700/112 |
| 11,897,744 | B2 * | 2/2024 | Muszinski | B29C 49/64 |
| 11,952,255 | B2 * | 4/2024 | Till | B67C 3/24 |
| 2014/0200696 | A1 * | 7/2014 | Batrin | G05B 19/41865 700/95 |
| 2015/0096267 | A1 | 4/2015 | Svensson | |
| 2016/0355285 | A1 * | 12/2016 | Ehmer | B65B 57/04 |
| 2018/0346307 | A1 * | 12/2018 | Sorbi | B67C 3/007 |
| 2020/0122495 | A1 * | 4/2020 | Ojima | B41J 3/4073 |
| 2020/0285223 | A1 * | 9/2020 | Pasquier | B29C 66/0242 |

FOREIGN PATENT DOCUMENTS

| | | | | |
|---|---|---|---|---|
| JP | 2003136273 | A | 5/2003 | |
| JP | 2004118532 | A | 4/2004 | |
| JP | 4322571 | B2 | 9/2009 | |
| JP | 2010036988 | A | 2/2010 | |
| JP | 6159922 | B2 | 7/2017 | |
| JP | 2019025521 | A | 2/2019 | |
| WO | 2016140197 | A1 | 9/2016 | |
| WO | WO-2019048181 | A1 * | 3/2019 | B29C 66/0242 |
| WO | 2019077524 | A1 | 4/2019 | |

OTHER PUBLICATIONS

Office Action issued for counterpart Japanese Application No. 2022-538670, transmitted from the Japanese Patent Office on Oct. 22, 2024(drafted on Oct. 16, 2024).

Office Action issued for counterpart Taiwanese Application 110126794, transmitted from the Taiwan Intellectual Property Office on Dec. 23, 2024 (issued on Dec. 18, 2024).

Office Action issued for counterpart Japanese Application No. 2022-538670, transmitted from the Japanese Patent Office on Mar. 11, 2025 (drafted on Mar. 4, 2025).

* cited by examiner

20

MANUFACTURING SYSTEM

The contents of the following Japanese patent application (s) are incorporated herein by reference:

NO. 2020-125756 filed in JP on Jul. 22, 2020

NO. PCT/JP2021/025051 filed in WO on Jul. 1, 2021

BACKGROUND

1. Technical Field

The present invention relates to a manufacturing system.

2. Related Art

Patent Document 1 discloses about filling a beverage can, which has been manufactured in a metal can manufacturing factory, with a content in a beverage can manufacturing factory.

PRIOR ART DOCUMENT

Patent Document

Patent Document 1: Japanese Patent Application Publication No. 2019-25521

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solving means of the invention.

Figure 1A:
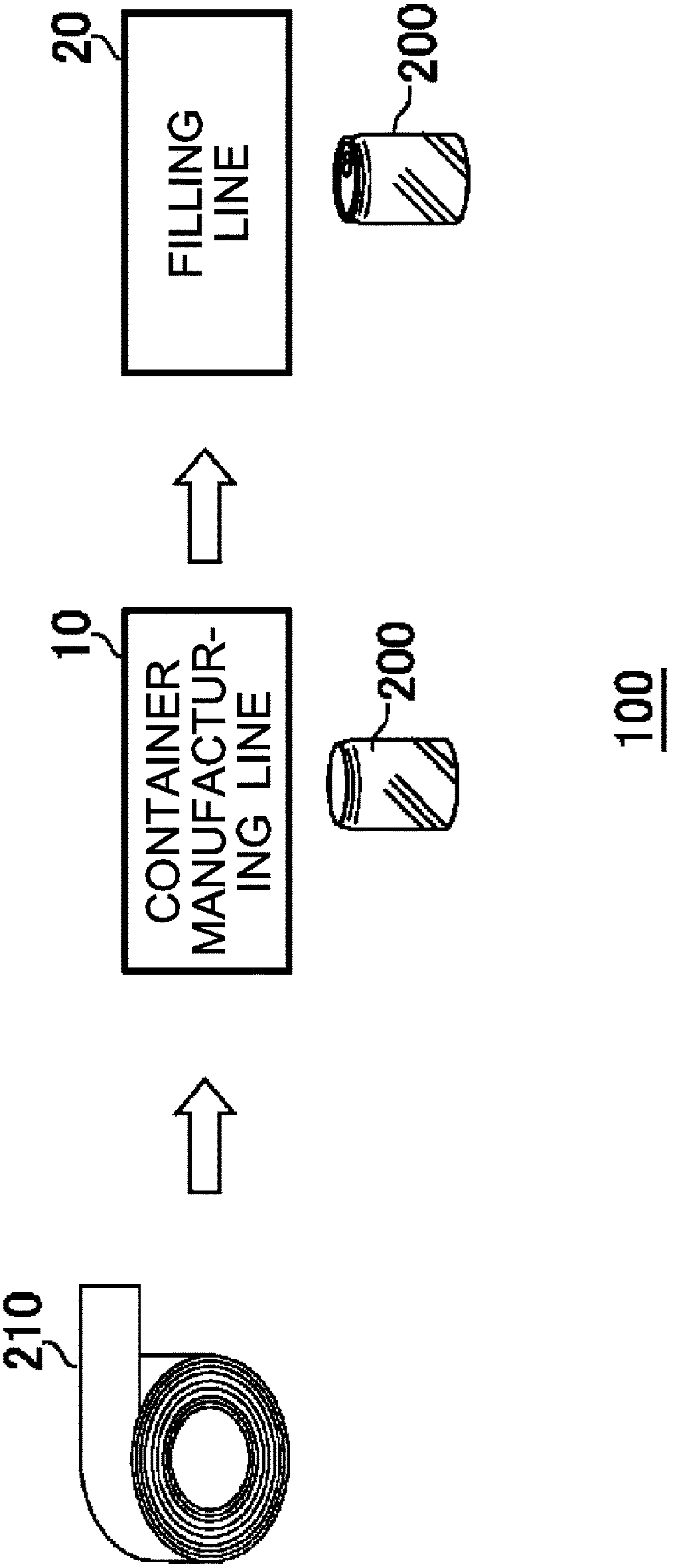
FIG. 1A illustrates an overview of a configuration of a manufacturing system 100.

FIG. 1A illustrates an overview of a configuration of a manufacturing system 100. The manufacturing system 100 includes a container manufacturing line 10 and a filling line 20. In an example described below, a container 200 may be a metal can, but the container 200 is not limited to be the metal can.

The container manufacturing line 10 manufactures the container 200 from a reserve material 210. When the container 200 is the metal can, the container manufacturing line 10 manufactures the container 200 by forming the reserve material 210 into a shape of the metal can. The container manufacturing line 10 may print any image on the container 200. The image may be a symbol, sign, letter, number, figure, color, or a combination thereof, or a design composed of a combination thereof. A specific process of the container manufacturing line 10 will be described later.

The container 200 is for being filled with a filler in the filling line 20. The container 200 may be a can, PET bottle, bottle, pouch, box, paper carton, cup, or the like. The container 200 may be anything as long as that can accommodate a filler that is filled in the filling line 20. A shape and material for the container 200 is not particularly limited.

The reserve material 210 is a material used for manufacturing the container 200. If the container 200 is the metal can, the reserve material 210 may be in a form of a coil of flat sheet used for producing the container 200. Front and back surfaces of the coil may be laminated. If the container 200 is the PET bottle, the reserve material 210 may be a preform used for manufacturing the PET bottle. The reserve material 210 may also be an article such as a piece of paper, a resin sheet, or a film.

The filling line 20 is configured to fill the container 200 with a predetermined filler. The filling line 20 may attach a lid to the container 200 filled with the filler. If the container 200 is the metal can, the filling line 20 manufactures a beverage can made by filling a metal can with a beverage. A specific process of the filling line 20 will be described later.

In the manufacturing system 100 of the present example, the container manufacturing line 10 is coupled to the filling line 20, and the container 200 manufactured in the container manufacturing line 10 is supplied to the filling line 20. The container manufacturing line 10 and the filling line 20 coupled in this manner may be referred to as "being connected in a/the line". The manufacturing system 100 of the present example can manage from the container manufacturing line 10 through the filling line 20 together by connecting the container manufacturing line 10 and the filling line 20 in the line. For example, the manufacturing system 100 can control operations of the container manufacturing line 10 and the filling line 20 depending on a line speed, a maintenance period, and the like.

Figure 1B:
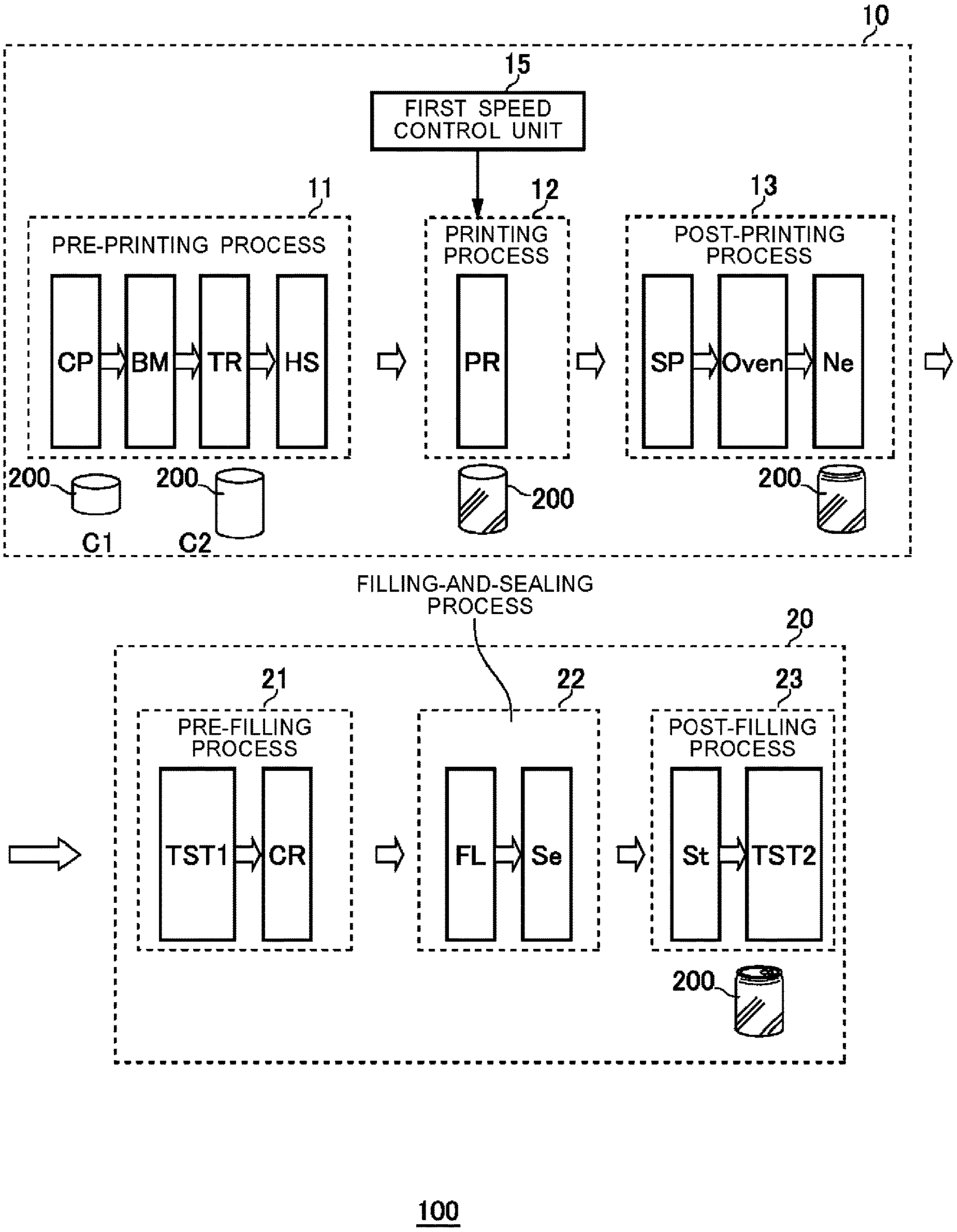
FIG. 1B illustrates one example of a configuration of the manufacturing system 100 more specifically.

FIG. 1B illustrates one example of a configuration of the manufacturing system 100 more specifically. The container manufacturing line 10 includes a pre-printing process 11, a printing process 12, a post-printing process 13, and the first speed control unit 15. The filling line 20 includes a pre-filling process 21, a filling-and-sealing process 22, and a post-filling process 23. In the present example, the container 200 will be explained as being a metal can, but the container 200 is not limited to being the metal can.

The pre-printing process 11 includes a cupping-press process (CP), a body maker process (BM), a trimmer process (TR), and a heat set process (HS).

In the cupping-press process (CP), the reserve material 210 is a coil, and a metal plate in a sheet form is rolled out and a material member is punched into a circular shape in order to form a cup shape from the coil. In the body maker process (BM), a material member C1 in the cup shape undergoes drawing and blanking through which a can body sidewall is stretched and thinned down, and then a can bottom is also formed, so that a can body C2 is formed. In the trimmer process (TR), an unnecessary part at an upper edge of the can body sidewall of the can body C2 may be trimmed down. Then, the container 200 may be heated in the heat set process (HS).

The printing process 12 includes a printing process (PR) for printing a predetermined image on the container 200. In the printing process (PR), a content to be printed is not particularly limited. In the printing process (PR), the can body sidewall of the can body C2 is painted and printed, for example. In the printing process (PR), the image is printed on the container 200 at a predetermined printing speed. In the printing process (PR), a printing speed may be constant, or may be variable. A printer for the printing process (PR) may include a printing press and a non-printing press.

The post-printing process 13 includes a spray process (SP), an oven process (Oven), and a necking process (Ne). In the spray process (SP), an internal surface of the container 200 is painted. The oven process (Oven) is for baking the container 200 in order to print printed ink on the container 200 by heating etc. The oven process (Oven) may include a method other than the heating, such as irradiating ultraviolet radiation. In the necking process (Ne), a mold is pressed on an upper part of the can body, and thereby a diameter of the upper part of the can body is reduced. If the internal surface of the can body has been laminated, the spray process (SP) may be omitted.

The first speed control unit 15 is configured to control a manufacturing line speed depending on a filling line speed of the filling line 20. The first speed control unit 15 is configured to adjust the manufacturing line speed such that the manufacturing line speed corresponds with the filling line speed. This phrase "corresponds with" is not limited to mean that the line speeds are matched up at a same speed. For example, meaning of the phrase "corresponds with" may include performing a feedback control on the line speed so that the manufacturing line speed approaches the filling line speed.

The manufacturing line speed is a line speed of the container manufacturing line 10. For example, the manufacturing line speed is a number of containers 200 per unit time, on which the image is printed in the printing process 12. The manufacturing line speed may also be a number of containers 200 per unit time, which are transported from the container manufacturing line 10.

The filling line speed is a line speed of the filling line 20. For example, the filling line speed is a number of containers 200 per unit time, which are filled with the filler and sealed in the filling-and-sealing process 22. The filling line speed may also be a number of containers 200 per unit time, which are withdrawn from the filling line 20.

The first speed control unit 15 may control the manufacturing line speed such that the manufacturing line speed becomes greater than the filling line speed. The first speed control unit 15 may control the manufacturing line speed so that the manufacturing line speed becomes greater than the filling line speed by more than 10%, or more than 20%. The first speed control unit 15 may decide an increased rate for the manufacturing line speed depending on the filling line speed.

Alternatively, the first speed control unit 15 may preset a plurality of manufacturing line speeds, and select any manufacturing line speed among the plurality of manufacturing line speeds depending on a situation. For example, the first speed control unit 15 may set a first manufacturing line speed S1 that corresponds to the filling line speed, and a second manufacturing line speed S2 that is faster than the first manufacturing line speed S1, and switch between the first manufacturing line speed S1 and the second manufacturing line speed S2. The first speed control unit 15 may preset three or more manufacturing line speeds.

In one example, the first speed control unit 15 is configured to change the manufacturing line speed of the container manufacturing line 10 depending on a change in a number of containers 200 in a predetermined process of the filling line 20. The first speed control unit 15 may reduce the manufacturing line speed when the number of containers 200 is increased, and increase the manufacturing line speed when the number of containers 200 is reduced. The first speed control unit 15 is configured to adjust an amount of change in the manufacturing line speed so that the containers 200 to be transported to the filling line 20 will not be insufficient.

The pre-filling process 21 is a process on an upper line stream compared with the filling-and-sealing process 22. The pre-filling process 21 includes a pre-filling inspection process (TST1), and a cleaning process (CR). In the pre-filling inspection process (TST1), quality of the container 200 is inspected. For example, in the pre-filling inspection process (TST1), a defect inside or outside the container 200 is inspected. A container 200 determined as being defective in the pre-filling inspection process (TST1) may be removed from the line. In the cleaning process (CR), the container 200 is cleaned before being filled with the filler. For example, in the cleaning process (CR), the container 200 is sprayed with at least one of gas or liquid in order to blow out a foreign substance and a water droplet.

The filling-and-sealing process 22 includes a filling process (FL) for filling the container 200 with the filler, and a sealing process (Se). The filler to be filled in the filling process (FL) may include, but not limited to beverage, food, oil, cleanser, cosmetics, or the like. For example, in the filling process (FL), the container 200 is filled with beverage at a predetermined filling speed. The filling-and-sealing process 22 may be in a maintenance period when a type of filler to be filled is changed. In the sealing process (Se), the container 200 filled with the filler is sealed. If the container 200 is a metal can, the container 200 is sealed with a lid.

The post-filling process 23 is a process on a lower line stream compared with the filling-and-sealing process 22. The post-filling process 23 includes a sterilization process (St), and a post-filling inspection process (TST2). In the sterilization process (St), the container 200 is sterilized. In the post-filling inspection process (TST2), the container 200 undergoes inspection for its amount of contents and sealability.

The first speed control unit 15 may change the manufacturing line speed depending on a change in a number of containers 200 in the filling line 20. For example, the first speed control unit 15 is configured to increase the manufacturing line speed in response to reduction in a number of containers 200 to be transported to the filling line 20. Alternatively, the first speed control unit 15 is configured to reduce the manufacturing line speed in response to increase in the number of containers 200 to be transported to the filling line 20. In this manner, the containers 200 in the filling line 20 can be prevented from being excessive or insufficient. In addition, the manufacturing system 100 of the present example can reduce stock of the containers 200 which are yet to be filled, by appropriately controlling the manufacturing line speed.

The pre-filling inspection process (TST1) is provided between the container manufacturing line 10 and the filling-and-sealing process 22 of the filling line 20. The pre-filling inspection process (TST1) of the present example is for inspecting of the container 200 after being manufactured, and inspecting of the container 200 before being filled with the filler. That is, the pre-filling inspection process (TST1) is provided once between the container manufacturing line 10 and the filling-and-sealing process 22. In this manner, in the manufacturing system 100 of the present example, a number of times of the pre-filling inspection process (TST1) can be reduced compared to a case in which a container manufacturing line and a filling line are provided in different factories and an inspection is performed in each of these factories.

In the pre-filling inspection process (TST1), a defective container 200 may be detected. For example, a distribution machine may be provided downstream from the pre-filling inspection process (TST1) in the filling line 20, and thereby the container 200 determined to be defective may be excluded from a line.

Figure 1C:
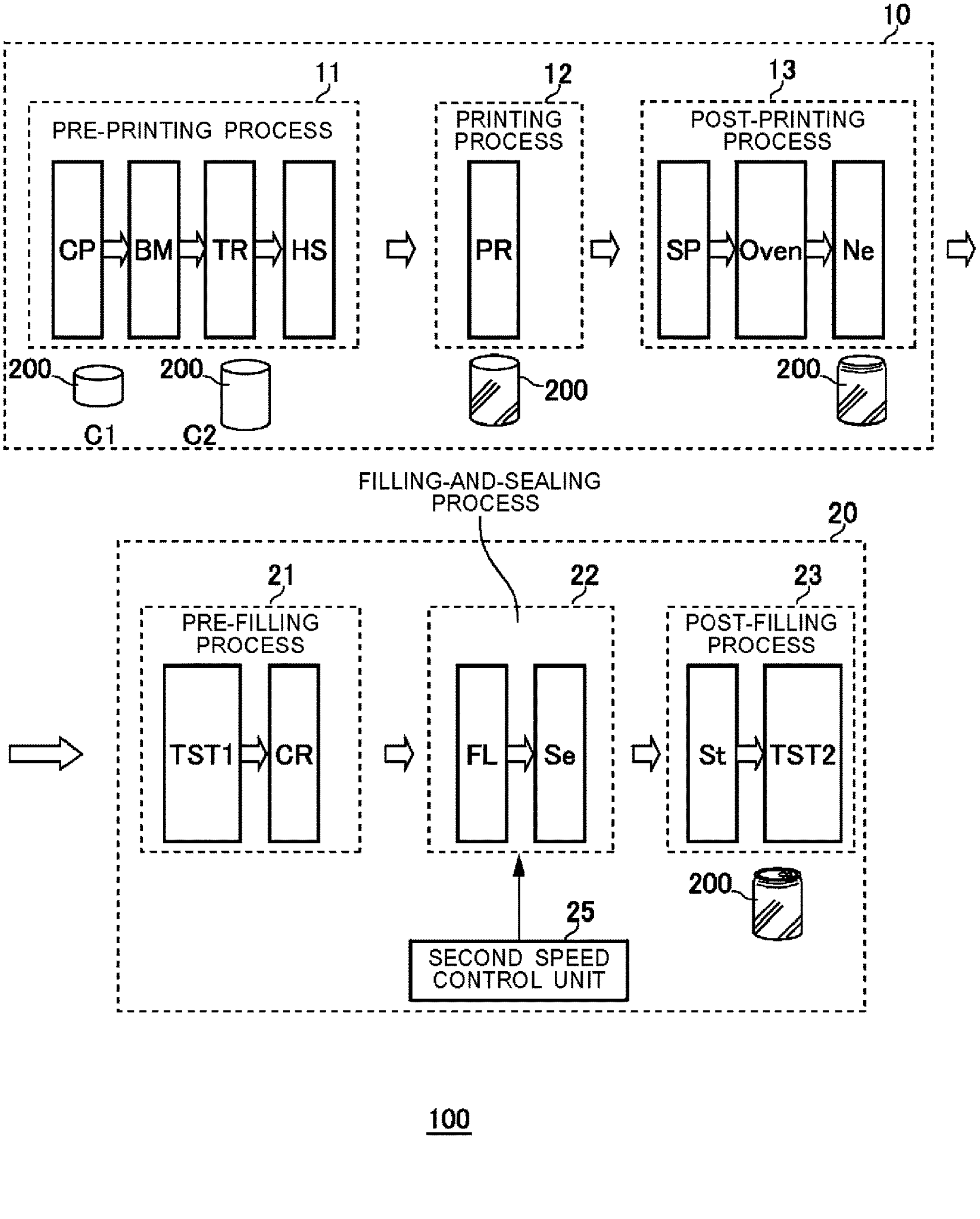
FIG. 1C illustrates one example of a configuration of a manufacturing system 100.

FIG. 1C illustrates one example of a configuration of a manufacturing system 100. The manufacturing system 100 of the present example is different from that of FIG. 1B in that this manufacturing system 100 includes a second speed control unit 25 in the filling line 20. In the present example, what is different from the example of FIG. 18 will be especially explained. The container manufacturing line 10 may not necessarily include the first speed control unit 15.

The second speed control unit 25 is configured to control a filling line speed of the filling line 20. The second speed control unit 25 may control the filling line speed depending on a manufacturing line speed of the container manufacturing line 10. For example, the second speed control unit 25 is configured to adjust the filling line speed such that the filling line speed corresponds with the manufacturing line speed of the container manufacturing line 10. The second speed control unit 25 may control such that the filling line speed becomes slower than the manufacturing line speed.

The second speed control unit 25 may also control the filling line speed depending on a number of containers 200 to be transported to the filling line 20. For example, the second speed control unit 25 is configured to increase the filling line speed when the number of containers 200 to be transported to the filling line 20 is increased. On the other hand, the second speed control unit 25 is configured to reduce the filling line speed when the number of containers 200 to be transported to the filling line 20 is reduced. In other words, controlling the filling line speed depending on the number of containers 200 may also include controlling the filling line speed depending on a changed rate for the containers 200 rather than the number of containers 200.

Figure 1D:
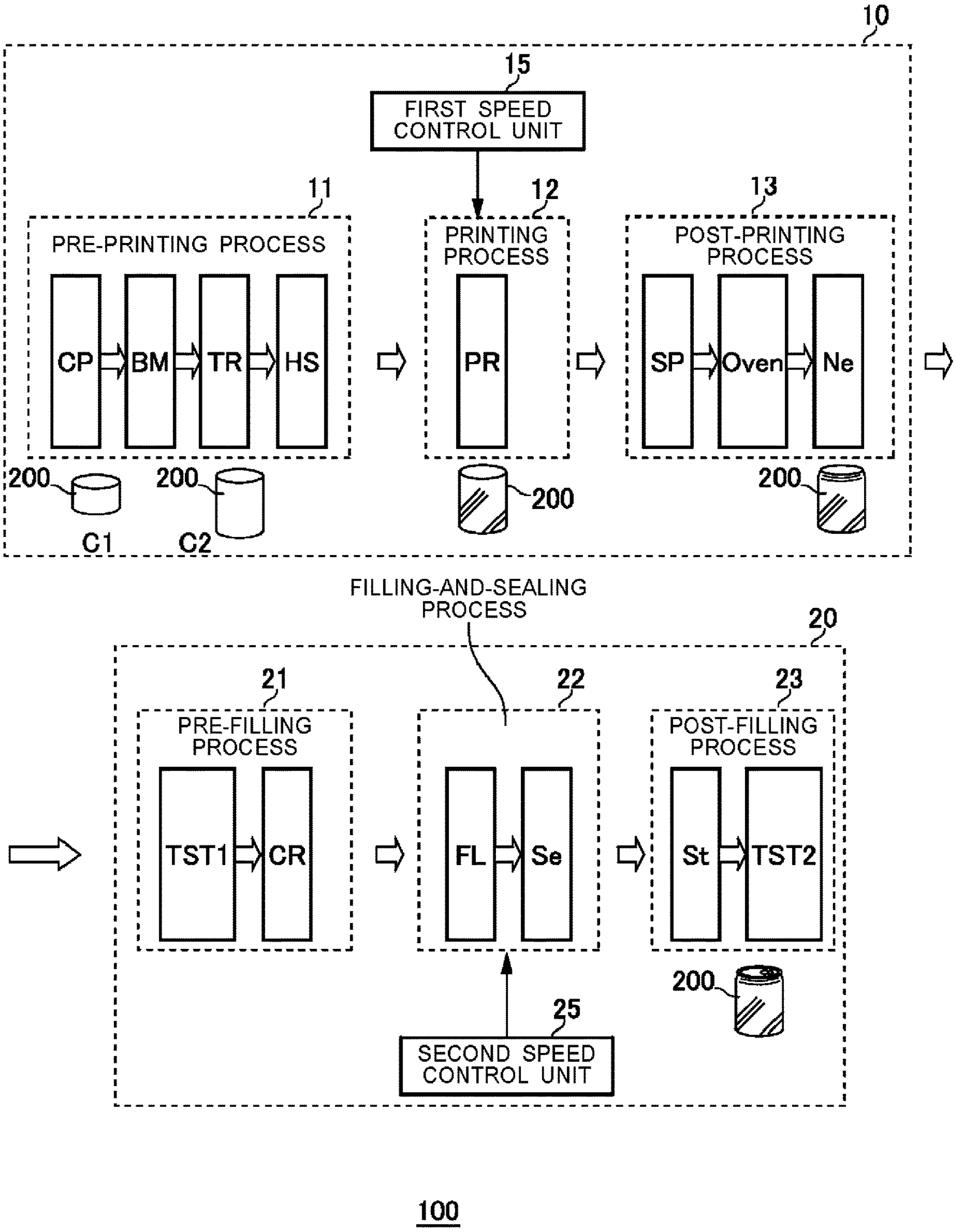
FIG. 1D illustrates one example of a configuration of a manufacturing system 100.

FIG. 1D illustrates one example of a configuration of a manufacturing system 100. The manufacturing system 100 of the present example includes both of a first speed control unit 15 and a second speed control unit 25. In the present example, what is different from the examples of FIGS. 1B and 1C will be especially explained. Note that, each of the first speed control unit 15 and the second speed control unit 25 may execute the control explained in the examples of FIGS. 1B and 1C.

The manufacturing system 100 may maintain an overall line speed in the container manufacturing line 10 and the filling line 20 at a constant speed by changing at least one of a line speed of the container manufacturing line 10 or a line speed of the filling line 20. For example, when the filling line speed is less than the manufacturing line speed, the first speed control unit 15 maintains the overall line speed at a constant speed by reducing the manufacturing line speed. When the filling line speed is greater than the manufacturing line speed, the second speed control unit 25 may maintain the overall line speed at a constant speed by reducing the filling line speed.

The manufacturing system 100 may control the manufacturing line speed depending on a number of containers 200 to be transported to the filling line 20. For example, the manufacturing system 100 is configured to increase the manufacturing line speed when the number of containers 200 to be transported is less than a predetermined number. In one example, the first speed control unit 15 is configured to increase the manufacturing line speed by 10% when the number of containers 200 becomes less than an any threshold value, and reduce the manufacturing line speed by 10% when the number of containers 200 becomes more than the any threshold value. In this manner, the manufacturing system 100 can stably transport the containers 200 to the filling line 20. A percentage of increasing or decreasing the line speed is not limited to that above.

The number of containers 200 may be measured at timing in any process upstream from the filling-and-sealing process 22. The number of containers 200 may be measured by a sensor, or a changed rate for the number of containers 200 may be measured. In other words, the manufacturing system 100 may be for determining whether there is enough number of containers 200 to be transported to the filling line 20, and not for necessarily measuring the number of containers 200.

Figure 2A:
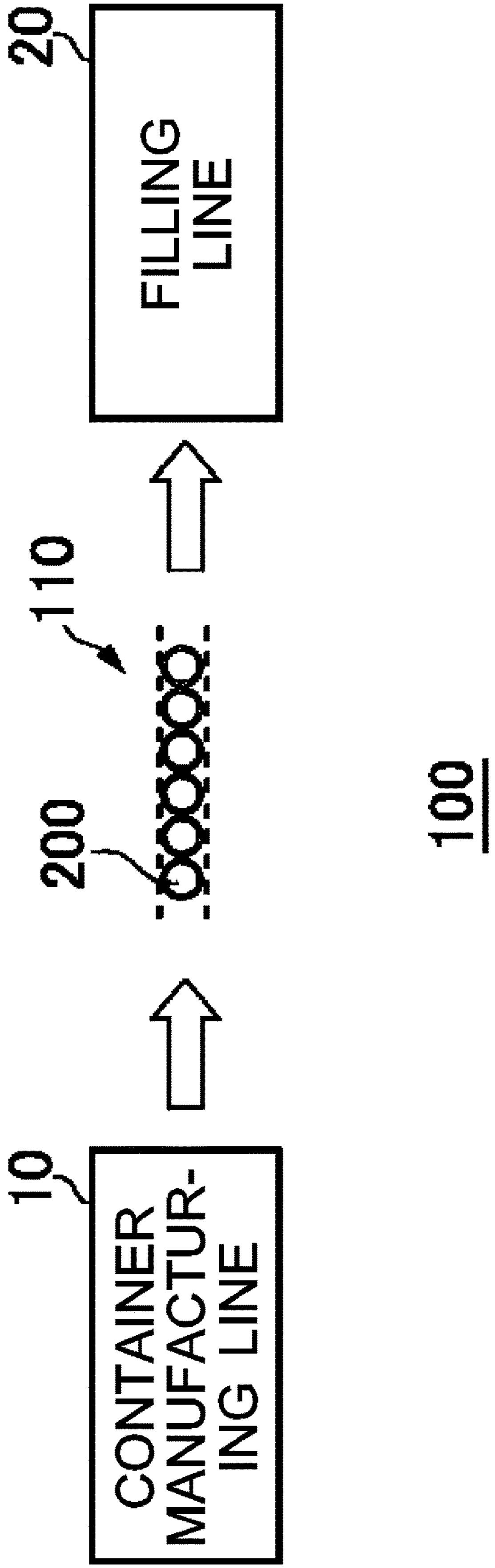
FIG. 2A illustrates one example of a coupling method of coupling a container manufacturing line 10 and a filling line 20.

FIG. 2A illustrates one example of a coupling method of coupling a container manufacturing line 10 and a filling line 20. A manufacturing system 100 of the present example includes a line coupling unit 110 between the container manufacturing line 10 and the filling line 20.

The line coupling unit 110 is configured to couple the container manufacturing line 10 and the filling line 20, and transport a container 200 manufactured in the container manufacturing line 10 to the filling line 20. In other words, in the line coupling unit 110, the container 200 manufactured in the container manufacturing line 10 is transported to the filling line 20 without being withdrawn from a line. As above, the line coupling unit 110 of the present example is configured to connect the container manufacturing line 10 and the filling line 20 in the line.

Figure 2B:
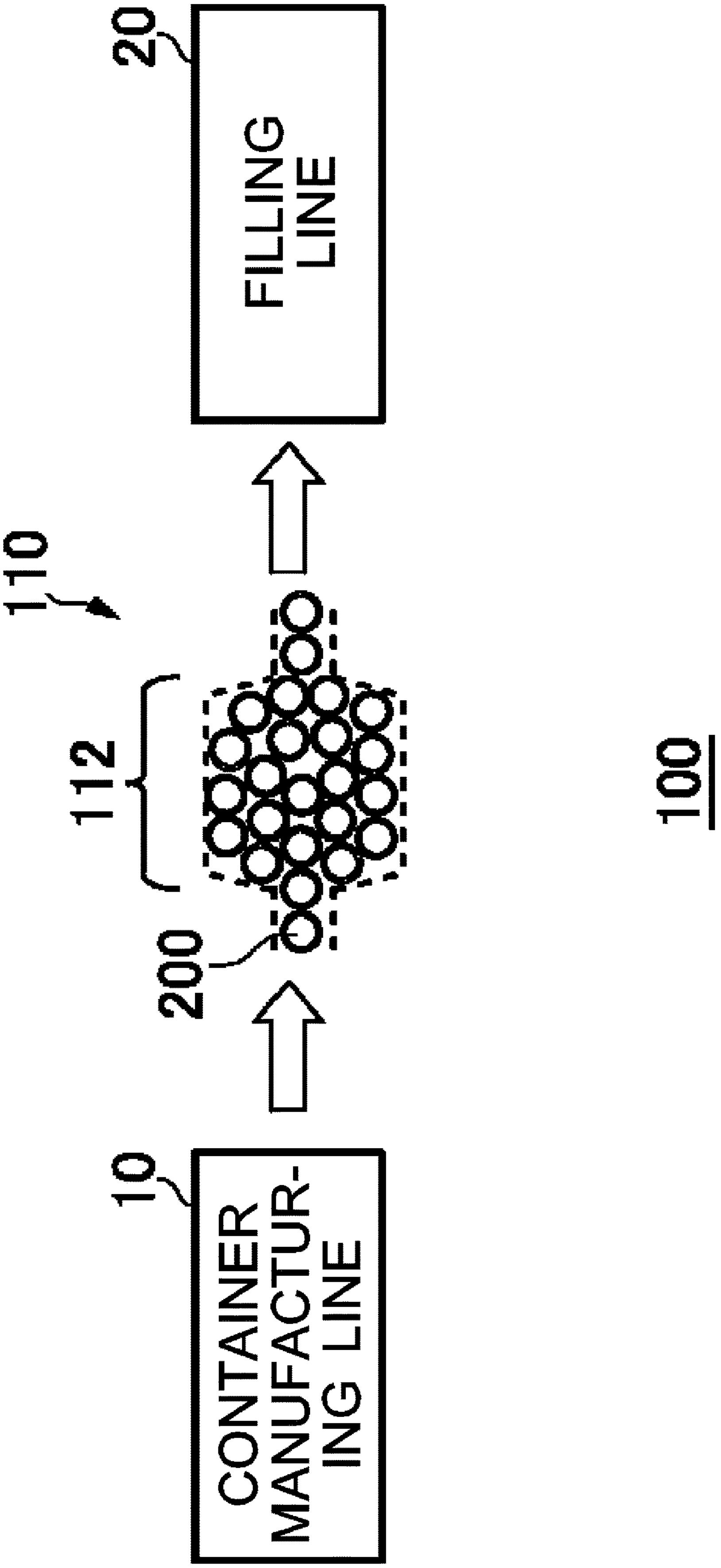
FIG. 2B illustrates one example of a coupling method of coupling a container manufacturing line 10 and a filling line 20.

FIG. 2B illustrates one example of a coupling method of coupling a container manufacturing line 10 and a filling line 20. A line coupling unit 110 of the present example is different from that of the example of FIG. 2A, in that this line coupling unit 110 includes an in-line accumulator 112.

The in-line accumulator 112 is provided between the container manufacturing line 10 and the filling line 20, and is for accumulating containers 200. The in-line accumulator 112 of the present example is provided in a process before a process of the filling line 20, and the containers 200, which are transported at a speed faster than the filling line speed, are accumulated in the in-line accumulator 112. In this manner, even when a line speed of the container manufacturing line 10 and the line speed of the filling line 20 are different from each other, the in-line accumulator 112 can stably supply the filling line 20 with the containers 200. If the containers 200 are stably supplied to the filling line 20, a filler can be prevented from being wastefully discarded due to the containers 200 being insufficient.

In addition, by virtue of providing the in-line accumulator 112, the filling line 20 can continue its operation even when the manufacturing line speed is reduced. Therefore, the manufacturing system 100 of the present example can maintain overall production efficiency even when the container manufacturing line 10 and the filling line 20 are coupled and a line speed of a line is changed.

Note that, the in-line accumulator 112 may not be provided at the position between the container manufacturing line 10 and the filling line 20. The in-line accumulator 112 may be provided between any processing of the container manufacturing line 10 or the filling line 20. For example, the in-line accumulator 112 is provided downstream from a printing process 12 in the container manufacturing line 10. Alternatively, the in-line accumulator 112 may be provided upstream from a filling-and-sealing process 22 in the filling line 20. A plurality of in-line accumulators 112 may be provided in the manufacturing system 100. The in-line accumulator 112 may be provided at any position in the manufacturing system 100 which has been explained in another example.

Figure 2C:
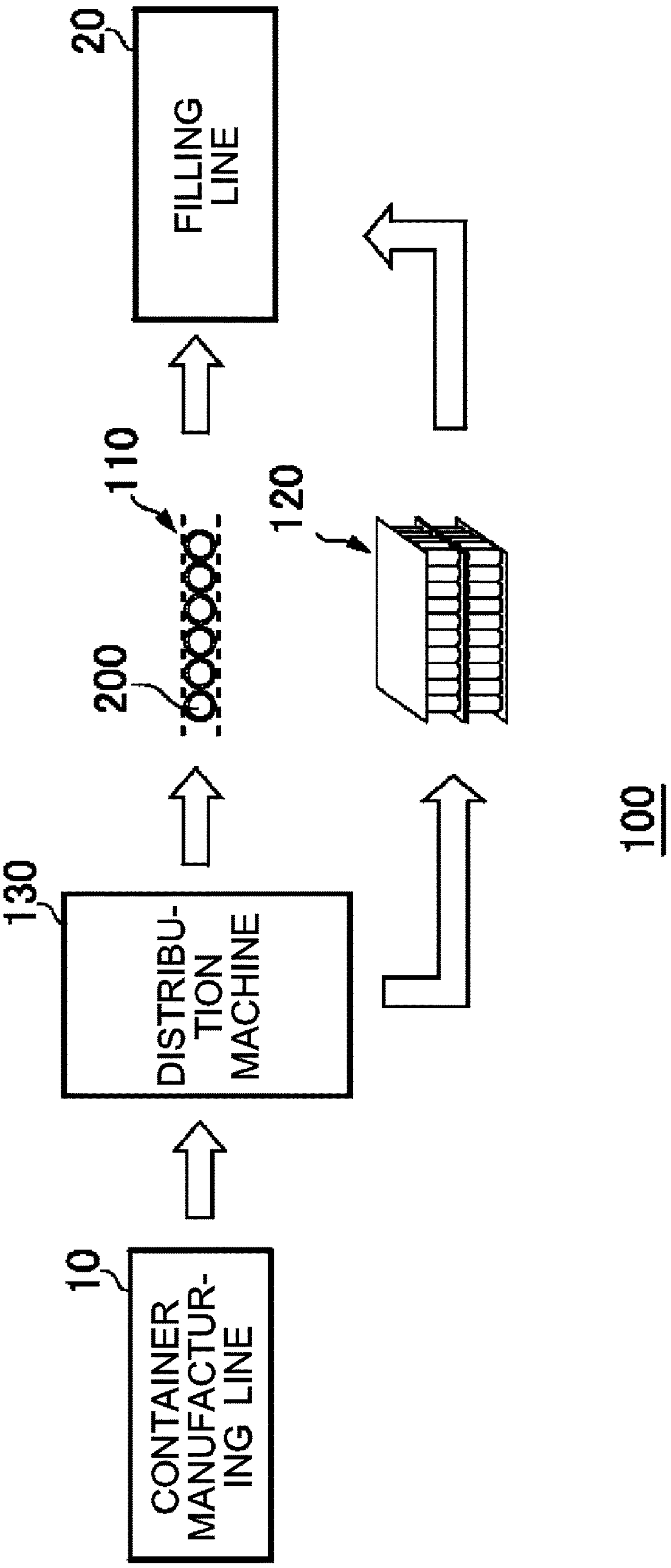
FIG. 2C illustrates one example of a coupling method of coupling a container manufacturing line 10 and a filling line 20.

FIG. 2C illustrates one example of a coupling method of coupling a container manufacturing line 10 and a filling line 20. The manufacturing system 100 of the present example includes a distribution machine 130 between the container manufacturing line 10 and the filling line 20. The manufacturing system 100 also includes a line coupling unit 110 and an off-line accumulator 120 between the container manufacturing line 10 and the filling line 20.

The distribution machine 130 is configured to distribute containers 200 manufactured in the container manufacturing line 10 to the line coupling unit 110 and the off-line accumulator 120. The distribution machine 130 may decide a place of distribution depending on a manufacturing line speed and a filling line speed. Further, the distribution machine 130 may switch the place of distribution depending on stocking status of the containers 200 in the manufacturing system 100.

For example, the manufacturing system 100 may distribute to a first accumulation process when the manufacturing line speed of the container manufacturing line 10 is faster than the filling line speed of the filling line 20, and a number of containers in the filling line 20 exceeds a predetermined percentage to capacity of the filling line 20. The predetermined percentage to capacity of the filling line 20 may be 100%, 95%, or 90%. The first accumulation process of the present example is the off-line accumulator 120.

The distribution machine 130 uses any distribution method among a partition plate method, turret method, slider method, roller method, pick-up method, vacuum method, and air method. In the partition plate method, a partition plate for guiding the containers 200 is moved in order to change a line for the place of distribution. In the turret method, a turret, which rotates and transports the containers 200, is used for the distribution.

In the slider method, the containers 200 are placed on a slider that is transported on a conveyor for the distribution. In the roller method, a rotating direction of a roller embedded on a front surface of a conveyor is changed for the distribution. In the pick-up method, the containers 200 are picked up by a robot in order to change the place of distribution.

In the vacuum method, a vacuum technique is used in the turret method, slider method, pick-up method, or the like in order to perform the distribution. In the air method, any type or air is blown onto a container 200 in order to change a line of the container 200 or drop the container 200 off from the line.

The off-line accumulator 120 is provided between the container manufacturing line 10 and the filling line 20, and is for accumulating containers 200. The off-line accumulator 120 of the present example is provided in a process before the filling line 20, and the containers 200, which are transported at a speed faster than the filling line speed, are accumulated out of a line. In this manner, the off-line accumulator 120 can supply the filling line 20 with the containers 200 at appropriate timing, such as after pausing time has passed for the filling line 20.

The off-line accumulator 120 is configured to accumulate the containers 200 manufactured in the container manufacturing line 10 out of the line. Because the off-line accumulator 120 is provided out of the line, the off-line accumulator 120 is not coupled to the container manufacturing line 10 and the filling line 20. For example, the off-line accumulator 120 is a palletizer for piling up the containers 200 on a pallet. The off-line accumulator 120 may provide the filling line 20 with the containers 200 that have been accumulated. In one example, the off-line accumulator 120 provides the filling line 20 with the containers 200 when the container manufacturing line 10 is paused.

The off-line accumulator 120 may have accumulation capacity greater than that of the in-line accumulator 112. Since the off-line accumulator 120 is provided out of the line, it is easier to increase or decrease its accumulation capacity compared with the in-line accumulator 112. If the off-line accumulator 120 is a palletizer for accumulating the containers 200, accumulation capacity of the off-line accumulator 120 may be increased by increasing a number of palletizers. By virtue of using the off-line accumulator 120 when accumulation capacity of the in-line accumulator 112 is insufficient, a larger difference in line speeds can be covered. Further, by virtue of using the off-line accumulator 120, timing to transport the containers 200 can easily be adjusted even when the filling line 20 is paused for a long time.

Figure 2D:
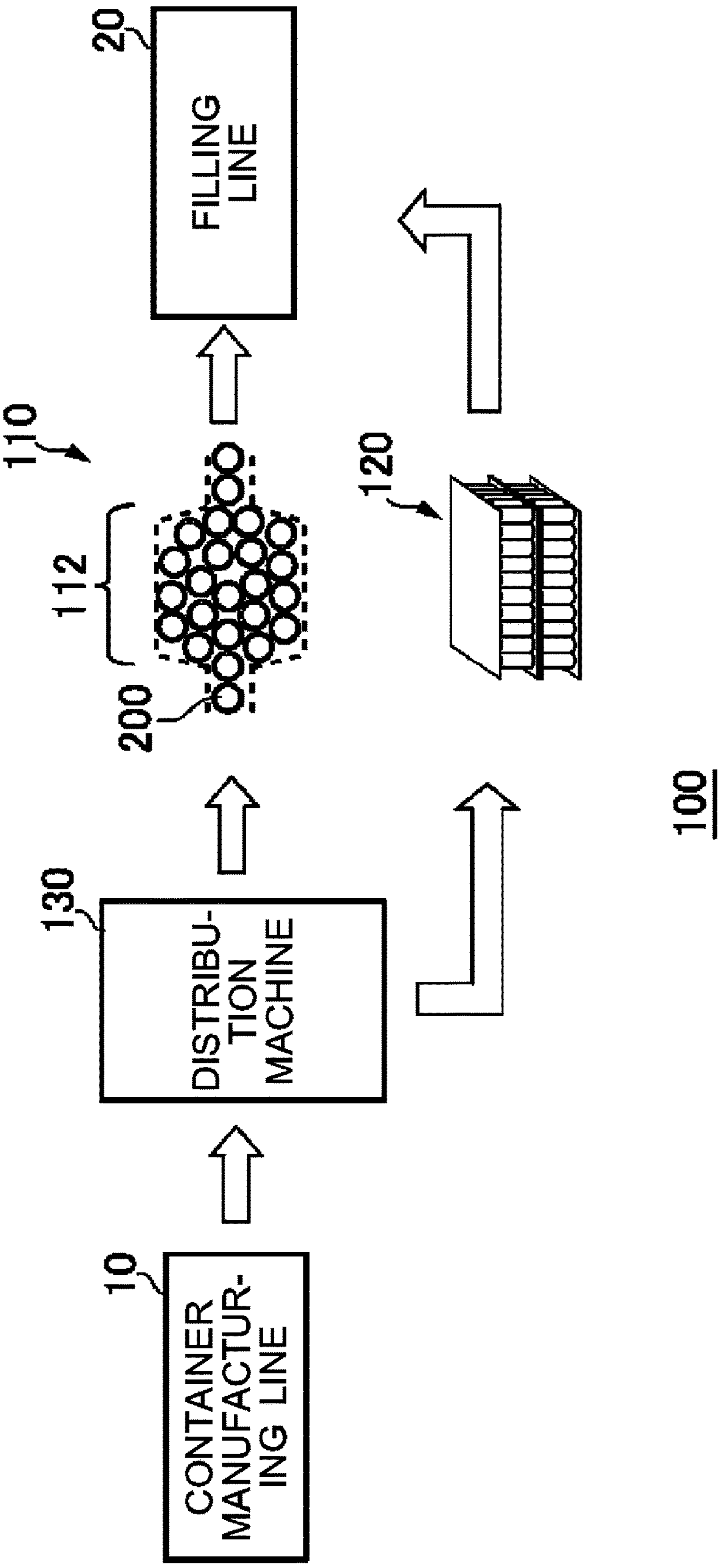
FIG. 2D illustrates one example of a coupling method of coupling a container manufacturing line 10 and a filling line 20.

FIG. 2D illustrates one example of a coupling method of coupling a container manufacturing line 10 and a filling line 20. A distribution machine 130 of the present example is configured to distribute containers 200 to an in-line accumulator 112 or an off-line accumulator 120. A manufacturing system 100 of the present example is different from the example of FIG. 2C in that this manufacturing system 100 is provided with the in-line accumulator 112 in a line coupling unit 110.

The distribution machine 130 is configured to distribute the containers 200 manufactured in the container manufacturing line 10 to the in-line accumulator 112 or the off-line accumulator 120. For example, when accumulation capacity of the in-line accumulator 112 becomes insufficient while the distribution machine 130 distributes the containers 200 to the in-line accumulator 112, the distribution machine 130 changes a place of distribution to be the off-line accumulator 120.

The distribution machine 130 may cause to accumulate in a second accumulation process when the manufacturing line speed of the container manufacturing line 10 is faster than the filling line speed of the filling line 20, and a number of containers in the filling line 20 exceeds a predetermined percentage to capacity of the filling line 20, and a predetermined percentage to accumulation capacity of a first accumulation process. The predetermined percentage to accumulation capacity of the first accumulation process may be 100%, 95%, or 90%. In the present example, the first accumulation process is the in-line accumulator 112, and the second accumulation process is the off-line accumulator 120.

Each process in the manufacturing system 100 may have pausing time due to maintenance of a machine, and the like. For example, in the container manufacturing line 10, a printing process 12 may be paused due to replacement of a printer. In the filling line 20, a filling-and-sealing process 22 may be paused for cleaning a machine at a time of changing a filler. The container manufacturing line 10 and the filling line 20 have different line pausing periods or line pausing frequencies from each other. In addition, there may be difference in time for replacing the container manufacturing line 10.

The manufacturing system 100 of the present example is configured to decide a place of distribution for the containers 200 to be distributed by the distribution machine 130 depending on line pausing time for the container manufacturing line 10 and the filling line 20. Alternatively, the manufacturing system 100 may change the place of distribution to which the distribution machine 130 distribute, depending on the line pausing time for the container manufacturing line 10 or the filling line 20. In this manner, the manufacturing system 100 can embody a combination of lines having line speeds and maintenance periods different from each other.

For example, if the container manufacturing line 10 has been paused, the containers 200 accumulated in the in-line accumulator 112 or the off-line accumulator 120 can be transported to the filling line 20 in order to maintain a constant filling line speed. In contrast, if the filling line 20 has been paused, the containers 200 are distributed to the in-line accumulator 112 or the off-line accumulator 120, and transportation of the containers 200 to the filling line 20 is paused. The distribution machine 130 may distribute to the in-line accumulator 112 when the filling line 20 is paused for a period of time shorter than a predetermined timeframe, and may distribute to the off-line accumulator 120 when the filling line 20 is paused for a period of time longer than the predetermined timeframe.

Note that, the distribution method performed by the distribution machine 130 is not limited to those in the present example. The distribution machine 130 may distribute the containers 200 to a line coupling unit 110 having no in-line accumulator 112, and a line coupling unit 110 having an in-line accumulator 112. Alternatively, the distribution machine 130 may distribute to any of a line coupling unit 110 having no in-line accumulator 112, a line coupling unit 110 having an in-line accumulator 112, and an off-line accumulator 120.

Figure 2E:
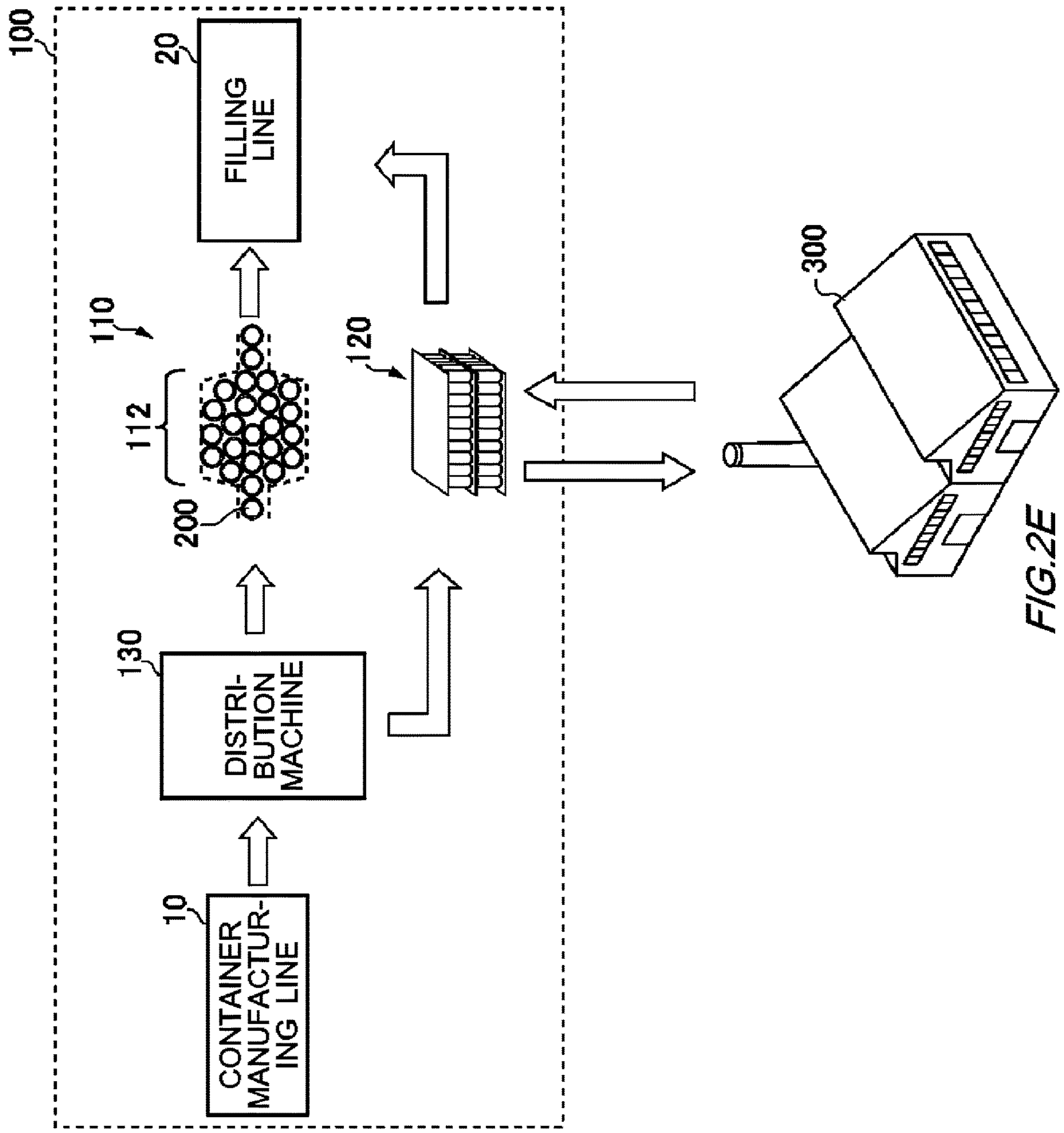
FIG. 2E illustrates one example of a manufacturing system 100 that is in cooperation with a factory 300.

FIG. 2E illustrates one example of a manufacturing system 100 that is in cooperation with a factory 300. The factory 300 is a different factory from the factory having the manufacturing system 100.

The manufacturing system 100 may dispatch the containers 200 accumulated in the off-line accumulator 120 to the factory 300. On the other hand, the filling line 20 may fill a container 200, which arrived from the factory 300 and is in the off-line accumulator 120, with a filler. When the manufacturing system 100 includes a plurality of container manufacturing lines 10, the off-line accumulator 120 may accumulate containers 200 manufactured in a container manufacturing line different from the container manufacturing line 10.

The distribution machine 130 may distribute a portion of containers 200 to the in-line accumulator 112, and distribute the rest of the containers 200 to the off-line accumulator 120. In this manner, the manufacturing system 100 can transport the portion of containers 200 to the filling line 20, and dispatch the rest of the containers 200 to the factory 300.

As shown with FIGS. 2A to 2E, by means of appropriately selecting a coupling method of coupling the container manufacturing line 10 and the filling line 20, it becomes easier to control the filling line speed at a constant speed. In addition, stock can be appropriately managed in the manufacturing system 100, and thereby a waste of material can be easily prevented.

The manufacturing system 100 may change the coupling method of coupling the container manufacturing line 10 and the filling line 20 depending on the manufacturing line speed and the filling line speed. For example, the manufacturing system 100 changes the place of distribution depending on a degree of difference in line speeds. The difference in line speeds refers to a difference in line speeds of the manufacturing line speed and the filling line speed.

Alternatively, the manufacturing system 100 may change the place of distribution depending on a ratio of line speeds. The ratio of line speeds is a ratio of the filling line speed of the filling line 20 to the manufacturing line speed of the container manufacturing line 10. In other words, the ratio of line speeds=the filling line speed/the manufacturing line speed. The farther the ratio of line speeds gets from 1, the larger the difference in line speeds becomes. The closer the ratio of line speeds gets to 1, the smaller the difference in line speeds becomes.

When the difference in line speeds is relatively small, the manufacturing system 100 may transport the containers 200 to the filling line 20 via the line coupling unit 110. In one example, when the difference in line speeds is relatively small is when the difference in line speeds is small to an extent that the accumulation process is not required. For example, it is when the ratio of line speeds is from 0.25 to 1.80. In this case, the manufacturing system 100 may couple the container manufacturing line 10 and the filling line 20 with the line coupling unit 110 as illustrated in FIG. 2A. Alternatively, for the example of FIG. 2C, the manufacturing system 100 may distribute the containers 200 to the line coupling unit 110 by means of the distribution machine 130.

When the difference in line speeds is modest, the manufacturing system 100 may transport the containers 200 to the filling line 20 via the in-line accumulator 112 or the off-line accumulator 120. In one example, when the difference in line speeds is modest is when the difference in line speeds is at a degree where the accumulation process is required but the off-line accumulator 120 is not required. In this case, the manufacturing system 100 may include the in-line accumulator 112 between the container manufacturing line 10 and the filling line 20 as illustrated in FIG. 2B. Alternatively, for the example of FIG. 2C, the manufacturing system 100 may distribute the containers 200 to the off-line accumulator 120 by means of the distribution machine 130. For the examples of FIGS. 2D and 2E, the manufacturing system 100 may distribute the containers 200 to the in-line accumulator 112 or the off-line accumulator 120 by means of the distribution machine 130.

When the difference in line speeds is relatively big, the manufacturing system 100 may transport the containers 200 to the filling line 20 via the off-line accumulator 120. In one example, when the difference in line speeds is relatively big is when the difference in line speeds is big to an extent that the off-line accumulator 120 is required. In this case, for the examples of FIGS. 2C, 2D, and 2E, the manufacturing system 100 may distribute the containers 200 to the off-line accumulator 120 by means of the distribution machine 130.

The manufacturing system 100 may mount a label printed with any image on a container 200. A type of the label may be any label type including a shrink sleeve label, stretch sleeve label, roll label, adhesive label, and the like. The label may be mounted in any of the container manufacturing line 10, the filling line 20, or the line coupling unit 110. When the label is used, the printing process 12 may be omitted.

Figure 3:
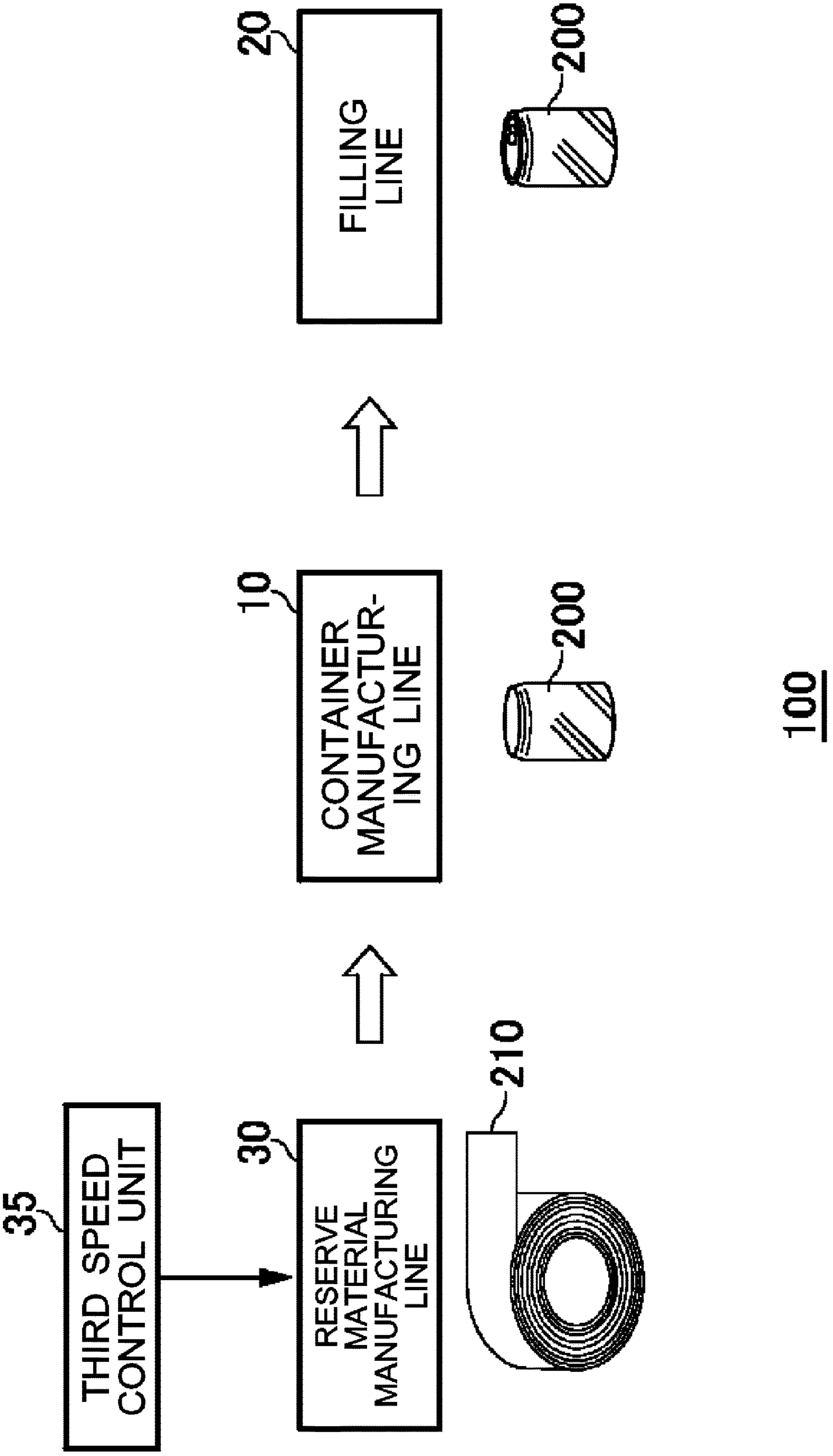
FIG. 3 illustrates one example of a configuration of a manufacturing system 100 including a reserve material manufacturing line 30.

FIG. 3 illustrates one example of a configuration of a manufacturing system 100 including a reserve material manufacturing line 30. The reserve material manufacturing line 30 of the present example may be appropriately provided to the manufacturing system 100 according to the another example.

The reserve material manufacturing line 30 is provided upstream from the container manufacturing line 10, and manufactures the reserve material 210. The reserve material manufacturing line 30 is configured to manufacture the reserve material 210 at a predetermined reserve material manufacturing line speed. The reserve material manufacturing line 30 is coupled to the container manufacturing line 10, and is for supplying the container manufacturing line 10 with the manufactured reserve material 210. In other words, the reserve material manufacturing line 30 of the present example is connected to the container manufacturing line 10 in a line.

The reserve material manufacturing line 30 may be a lamination line for laminating the reserve material 210 in a film laminating method, an extrusion laminating method, or the like. The film laminating method is a laminating method in which a pre-formed film is attached on a metal base material by means of thermal bonding, an adhesive, or the like. The extrusion laminating method is a laminating method in which a molten thin film of thermoplastic resin pressed out of a T-die is attached on a metal base material.

The third speed control unit 35 controls the reserve material manufacturing line speed depending on the manufacturing line speed and the filling line speed. For example, the third speed control unit 35 controls such that the reserve material manufacturing line speed corresponds with the manufacturing line speed and the filling line speed. The third speed control unit 35 may control such that the reserve material manufacturing line speed becomes greater than the manufacturing line speed.

The manufacturing system 100 may further include a first speed control unit 15 and a second speed control unit 25. The manufacturing system 100 may control such that a line speed on an upstream side becomes greater. For example, the third speed control unit 35 is configured to control such that the reserve material manufacturing line speed becomes greater than the manufacturing line speed and the filling line speed. In addition, the first speed control unit 15 may control such that the manufacturing line speed becomes greater than the filling line speed. By virtue of causing the line speed on the upstream side to be greater and accumulating the containers 200, insufficiency of the containers 200 can be avoided.

For example, the manufacturing system 100 may adjust each line speed such that the line speeds satisfy any of the following (1) to (3).

(1) The reserve material manufacturing line speed=the manufacturing line speed=filling line speed (2) The reserve material manufacturing line speed=the manufacturing line speed>the filling line speed (3) The reserve material manufacturing line speed>the manufacturing line speed>the filling line speed The manufacturing system 100 of the present example can further reduce wastes of stocks by connecting the reserve material manufacturing line 30, the container manufacturing line 10, and the filling line 20 in a line. The manufacturing system 100 of the present example can reduce wastes in stocks for both of the container 200 and the reserve material 210, and provide stable manufacturing at a same time. Note that, an accumulation process for accumulating the reserve material 210 may be provided between the reserve material manufacturing line 30 and the container manufacturing line 10. The accumulation process between the reserve material manufacturing line 30 and the container manufacturing line 10 may be provided in a line or out of the line.

Figure 4A:
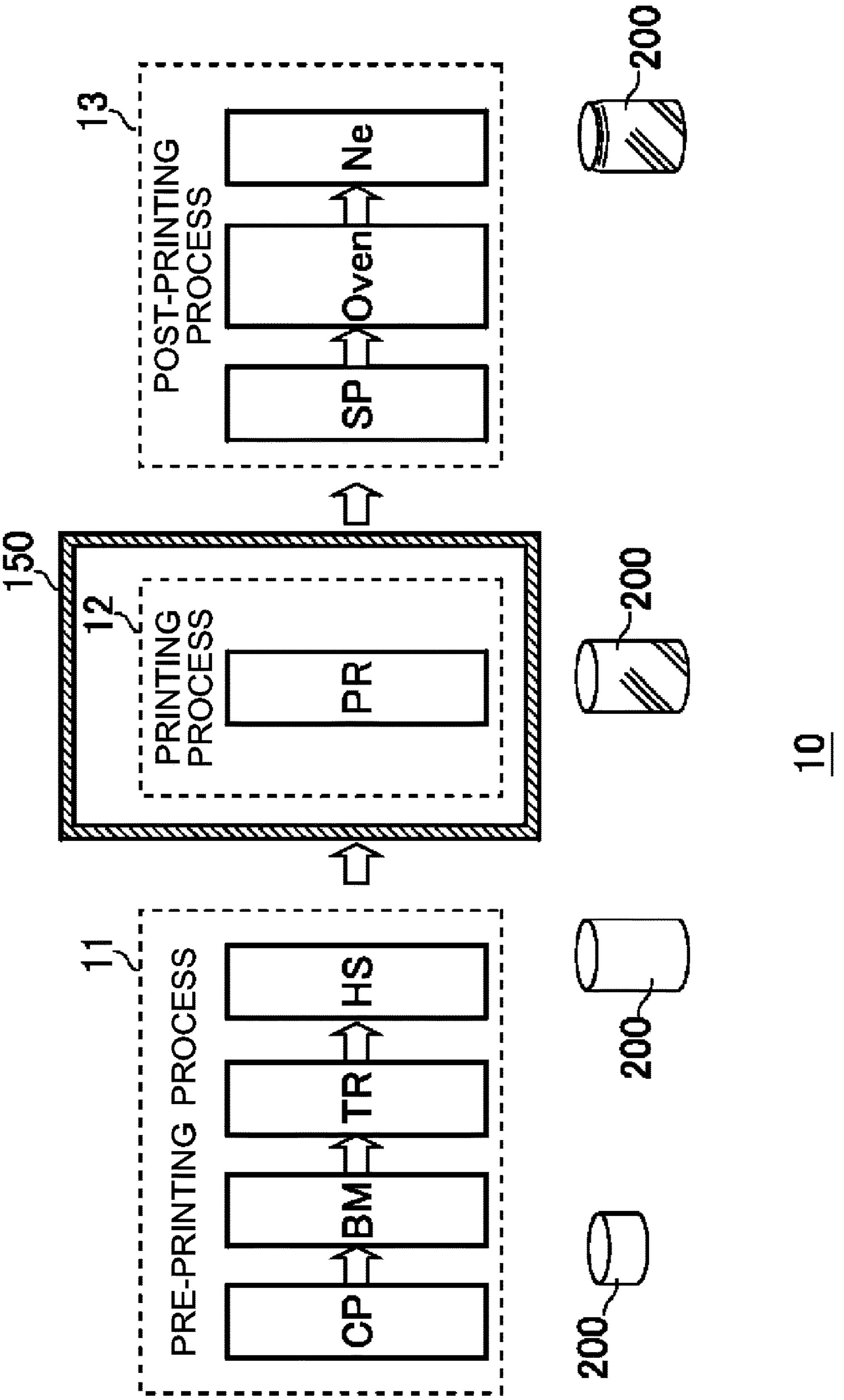
FIG. 4A illustrates one example of a configuration of a container manufacturing line 10 including a partition unit 150.

FIG. 4A illustrates one example of a configuration of a container manufacturing line 10 including a partition unit 150. The container manufacturing line 10 of the present example includes the partition unit 150.

The partition unit 150 is configured to surround a predetermined process. The partition unit 150 is for partitioning space, and thereby controlling an environment in the partitioned space. The partition unit 150 is used for controlling at least one of room temperature, humidity, atmospheric pressure including positive pressure and negative pressure, smell, or cleanliness in the space. For example, the partition unit 150 is a curtain or a wall. The manufacturing system 100 may include a clean room formed with the partition unit 150.

The partition unit 150 may be provided for at least some process among the processes of the container manufacturing line 10. The partition unit 150 of the present example is provided for a printing process 12. The partition unit 150 is for surrounding a machine used in the printing process 12. In this manner, the partition unit 150 prevents smell of ink etc. from flowing out from the printing process 12 into a filling line 20. The manufacturing system 100 may also prevent smell from flowing out into another process by controlling airflow of an air conditioner in the factory.

The partition unit 150 may provide a cleanliness class different from that in another process. The partition unit 150 may be a wall of the clean room. For example, the partition unit 150 is for providing the container manufacturing line 10 with a cleanliness class higher than a cleanliness class of the filling line 20.

The manufacturing system 100 of the present example can control environment by partitioning a predetermined process with the partition unit 150, and thereby provide stable quality. In addition, the manufacturing system 100 of the present example can reduce influence from another process by partitioning the predetermined process with the partition unit 150, and thereby improve hygiene. The partition unit 150 may be provided across a plurality of processes.

Figure 4B:
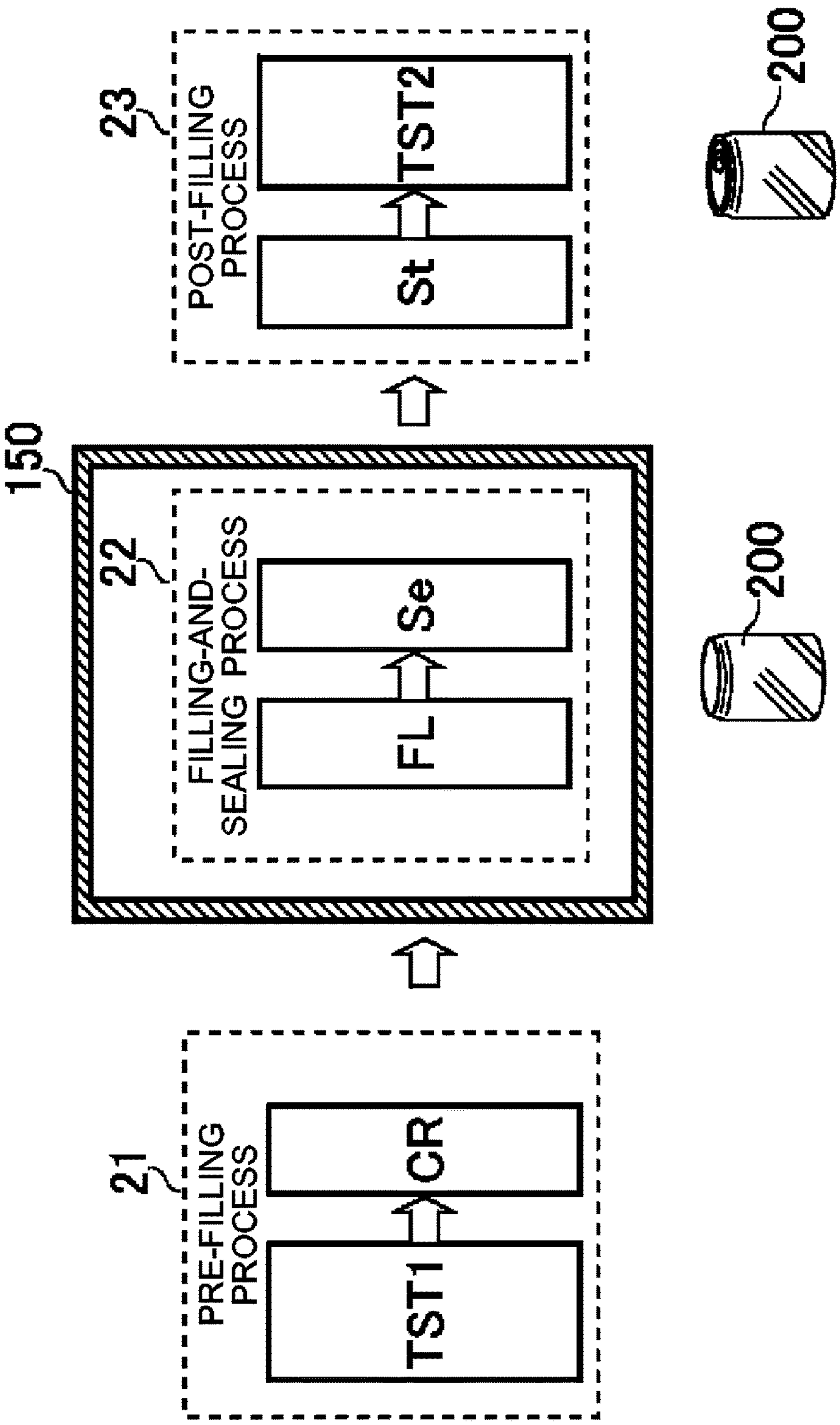
FIG. 4B illustrates one example of a configuration of a manufacturing system 100 including a partition unit 150.

FIG. 4B illustrates one example of a configuration of a manufacturing system 100 including a partition unit 150. The manufacturing system 100 of the present example includes the partition unit 150 in a filling line 20.

The partition unit 150 is provided for at least some process among processes of the filling line 20. The partition unit 150 of the present example is provided for a filling-and-sealing process 22. In this manner, the partition unit 150 prevents a foreign substance from being mixed into the filling-and-sealing process 22. Therefore, even when the filling line 20 is connected with a container manufacturing line 10 and a reserve material manufacturing line 30 in a line, mutual influence between them can be reduced. Note that, the partition unit 150 may be provided in both of any process in the container manufacturing line 10 and any process in the filling line 20.

Figure 4C:
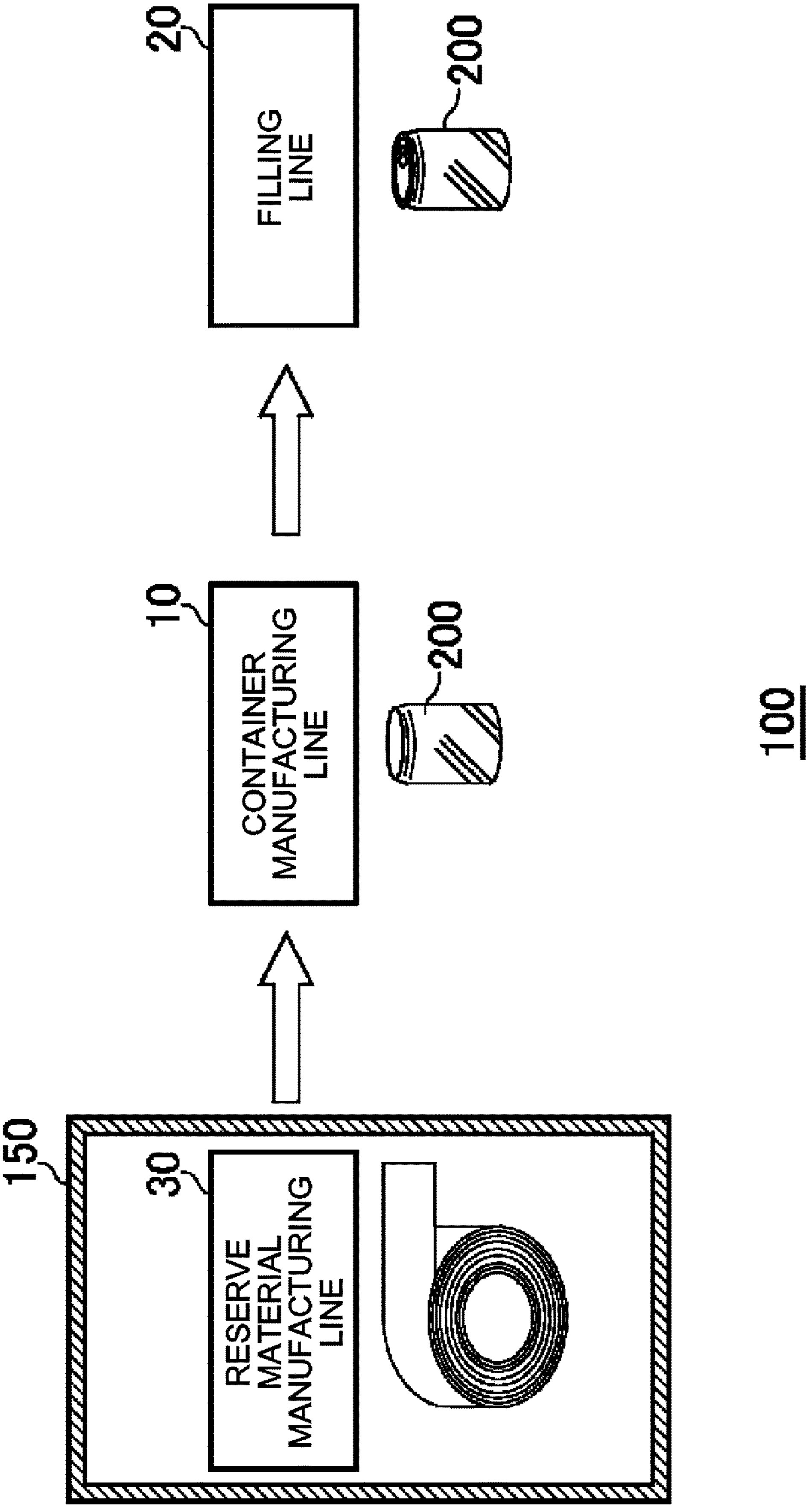
FIG. 4C illustrates one example of a configuration of a manufacturing system 100 including a partition unit 150.

FIG. 4C illustrates one example of a configuration of a manufacturing system 100 including a partition unit 150. The manufacturing system 100 of the present example includes the partition unit 150 for a reserve material manufacturing line 30. In the present example, a cleanliness class of the reserve material manufacturing line 30 is higher than a cleanliness class of a container manufacturing line 10. In other words, processing of processes of laminating a metal can coil, manufacturing a PET bottle preform, and the like are performed in an environment in higher cleanliness class than those in a printing process for a container 200 and the like. Note that, the partition unit 150 may be provided in other processes in the container manufacturing line 10 and the filling line 20. In this manner, even when the reserve material manufacturing line 30 and the container manufacturing line 10 are connected in a line, influence from the container manufacturing line 10 and the filling line 20 on the reserve material manufacturing line 30 can be reduced.

Figure 5:
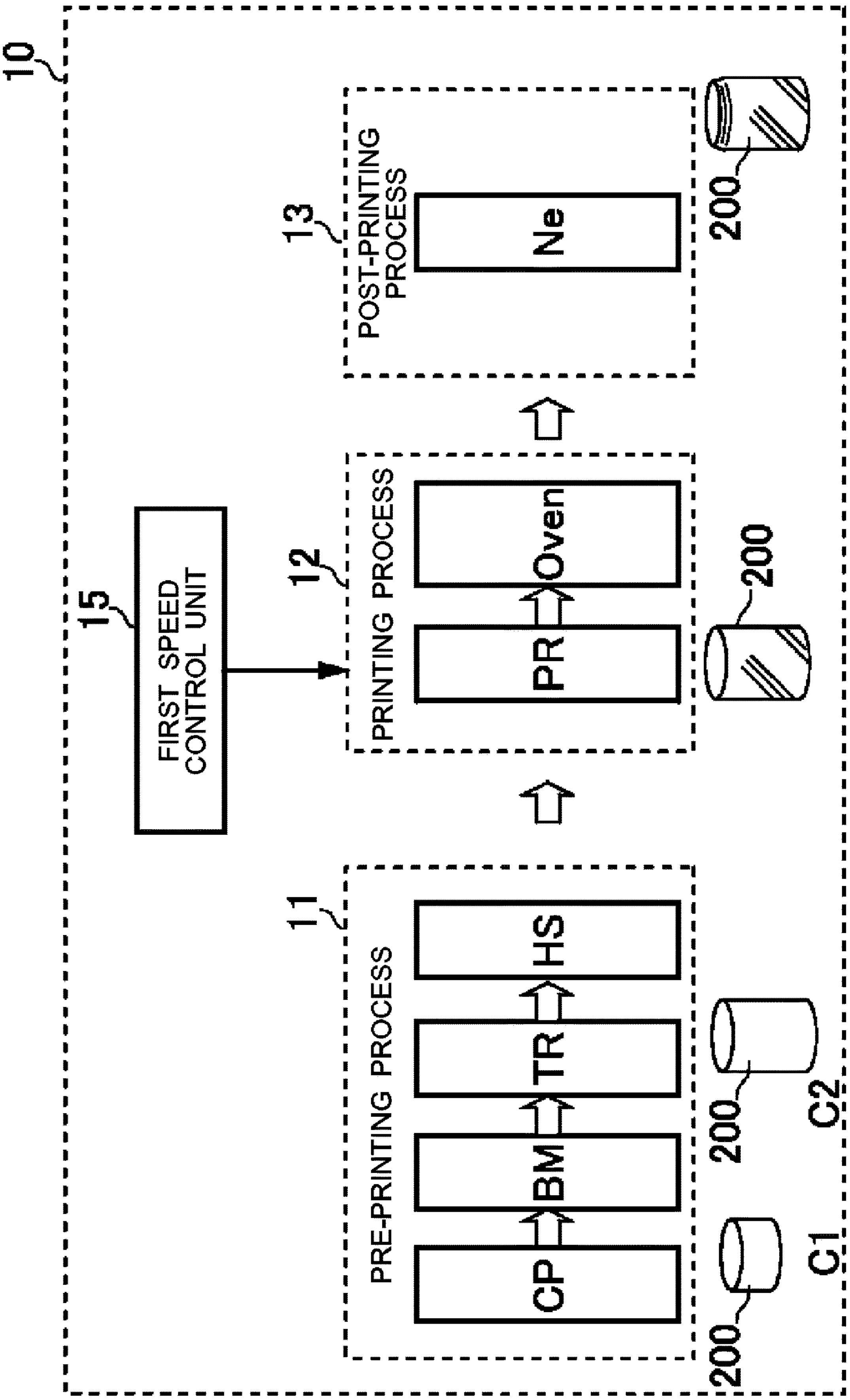
FIG. 5 illustrates a variant example of the container manufacturing line 10.

FIG. 5 illustrates a variant example of the container manufacturing line 10. A container 200 of the present example is a metal can provided with a resin coat on its inner and outer surfaces. Because the resin coat of the container 200 functions as lubrication fluid, a cleaning process (WM) can be omitted after forming.

In the container manufacturing line 10 of the present example, an oven process (Oven) is included after a printing process (PR) of a printing process 12, whereas a spray process (SP) and an oven process (Oven) are not included in a post-printing process 13. Also, because the container manufacturing line 10 of the present example manufactures the container 200 without using lubrication fluid, no cleaning process (WM) may be needed after formation.

The manufacturing system 100 of the present example includes a first speed control unit 15 in the container manufacturing line 10, and controls manufacturing line speed depending on filling line speed of a filling line 20 by adjusting speed of the printing process (PR). Note that, the container manufacturing line 10 of the present example may appropriately be used in combination with the manufacturing system 100 of another example. In other words, the manufacturing system 100 may include a second speed control unit 25, or include both of a first speed control unit 15 and the second speed control unit 25.

Figure 6:
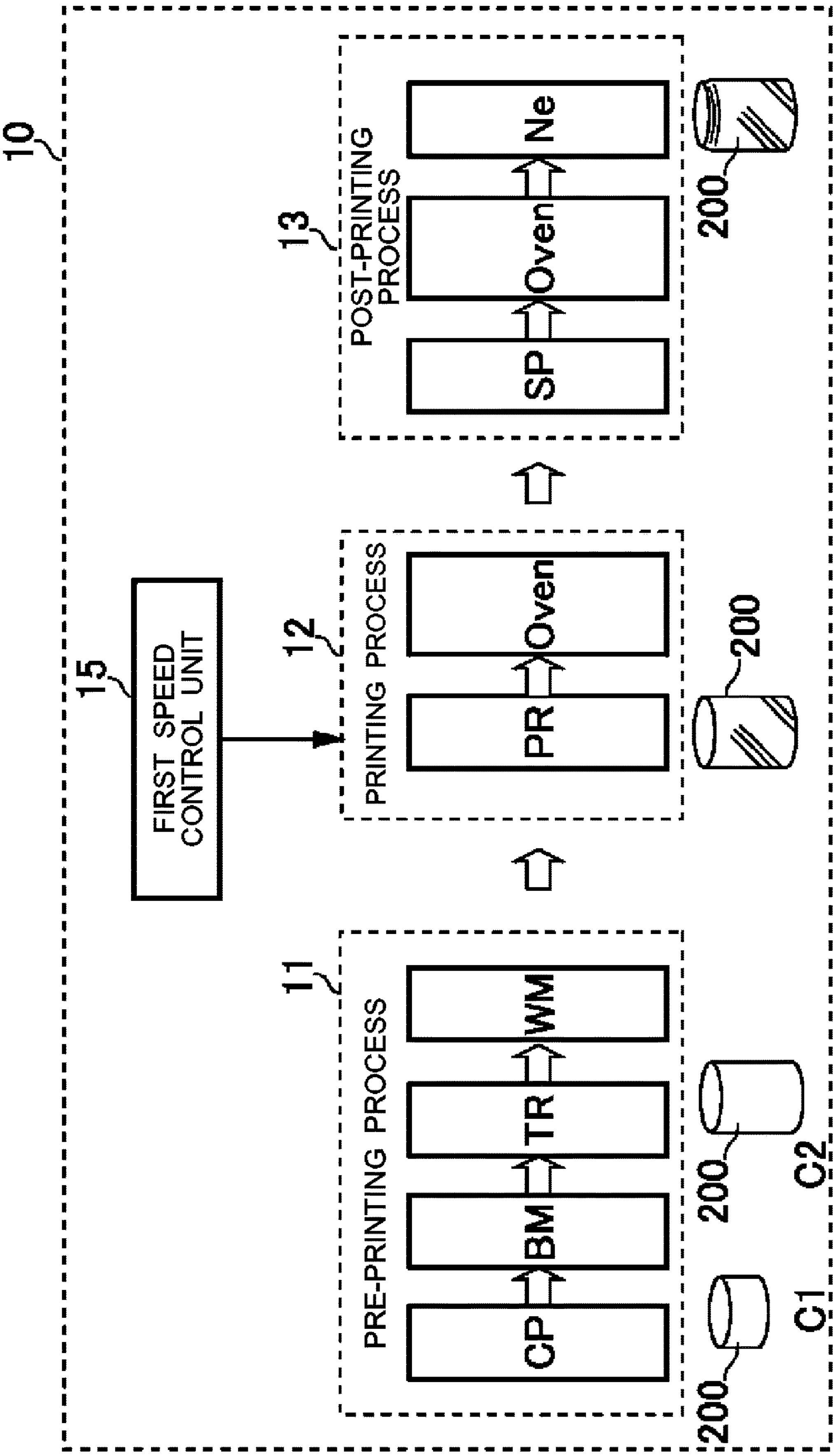
FIG. 6 illustrates a variant example of the container manufacturing line 10 for manufacturing a DI can.

FIG. 6 illustrates a variant example of the container manufacturing line 10 for manufacturing a DI can. A container 200 of the present example is the DI can. The DI can is formed into a bottomed cylindrical shape by performing a DI process (i.e., drawing and blanking process) on a material member C1 in a cup shape. A pre-printing process 11 of the present example includes a cleaning process (WM) after a trimmer process (TR). Note that, the container manufacturing line 10 of the present example may appropriately be used in combination with the manufacturing system 100 of another example.

Figure 7:
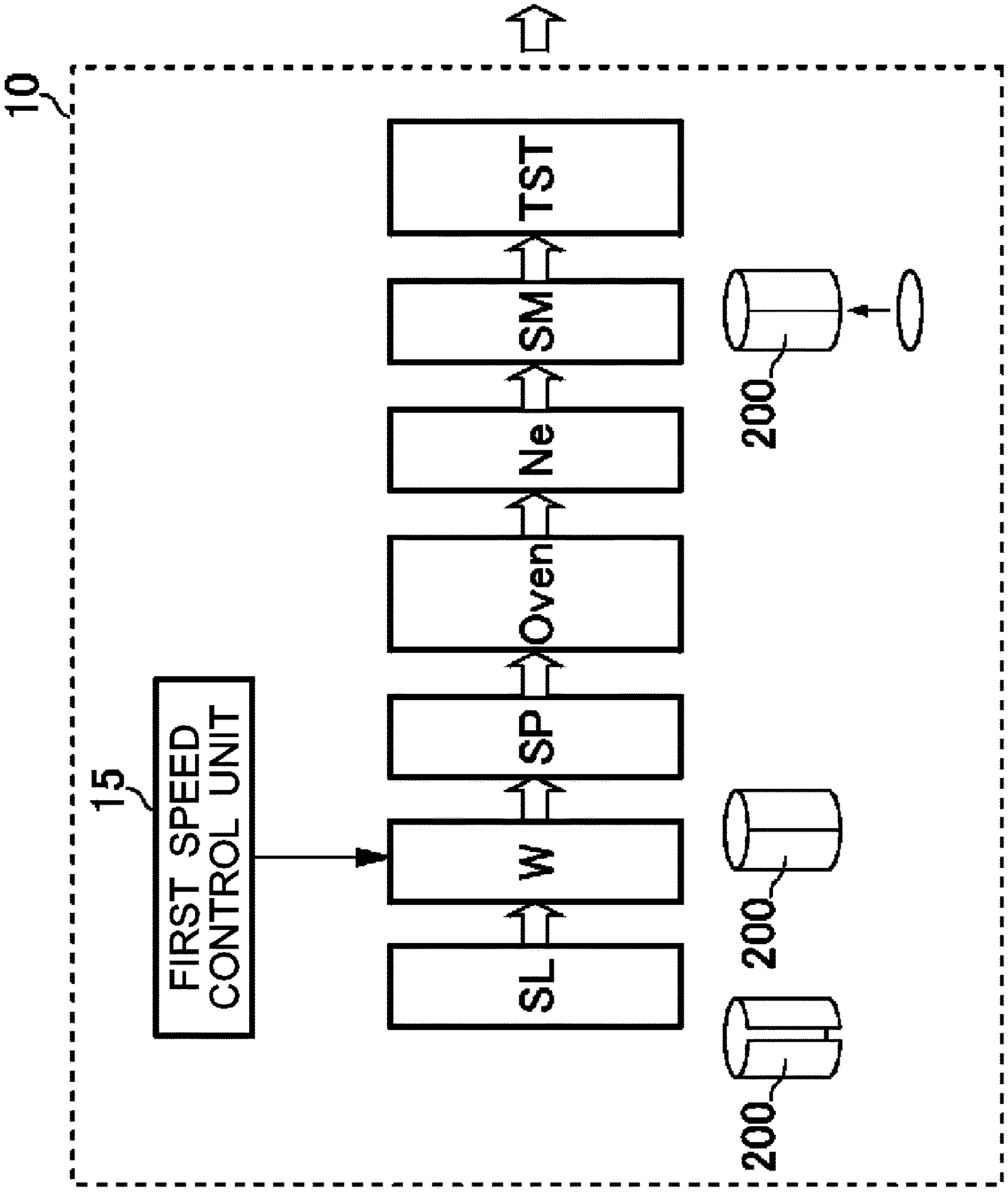
FIG. 7 illustrates a variant example of the container manufacturing line 10 for manufacturing a 3-piece can.

FIG. 7 illustrates a variant example of the container manufacturing line 10 for manufacturing a 3-piece can. A container 200 of the present example is the 3-piece can made by joining members through welding. The container manufacturing line 10 includes a slitter process (SL), a welding process (W), a spray process (SP), an oven process (Oven), a necking process (Ne), a seamer process (SM), and an empty can inspection process (TST).

In the slitter process (SL), a reserve material 210 is cut into a size of one can of the container 200 in order to form a metal plate in a sheet form. The reserve material 210 in the sheet form may have been printed with any image before being manufactured into the can. In the welding process (W), both ends of the reserve material 210 in the sheet form are welded and joined in order to form the container 200 in a cylindrical shape. In the spray process (SP), inner and outer surfaces of the welded part of the container 200 is sprayed with coating and thereby protected. In the seamer process (SM), a bottom lid is seamed to one opening of the container 200 in the cylindrical shape. In the empty can inspection process (TST), leakage is inspected on an empty container 200.

The first speed control unit 15 may control a manufacturing line speed by adjusting a speed of the welding process (W) depending on a filling line speed of a filling line 20. Alternatively, the first speed control unit 15 may control the manufacturing line speed by adjusting a speed of a process other than the welding process (W). Note that, the container manufacturing line 10 of the present example may appropriately be used in combination with the manufacturing system 100 of another example.

Figure 8:
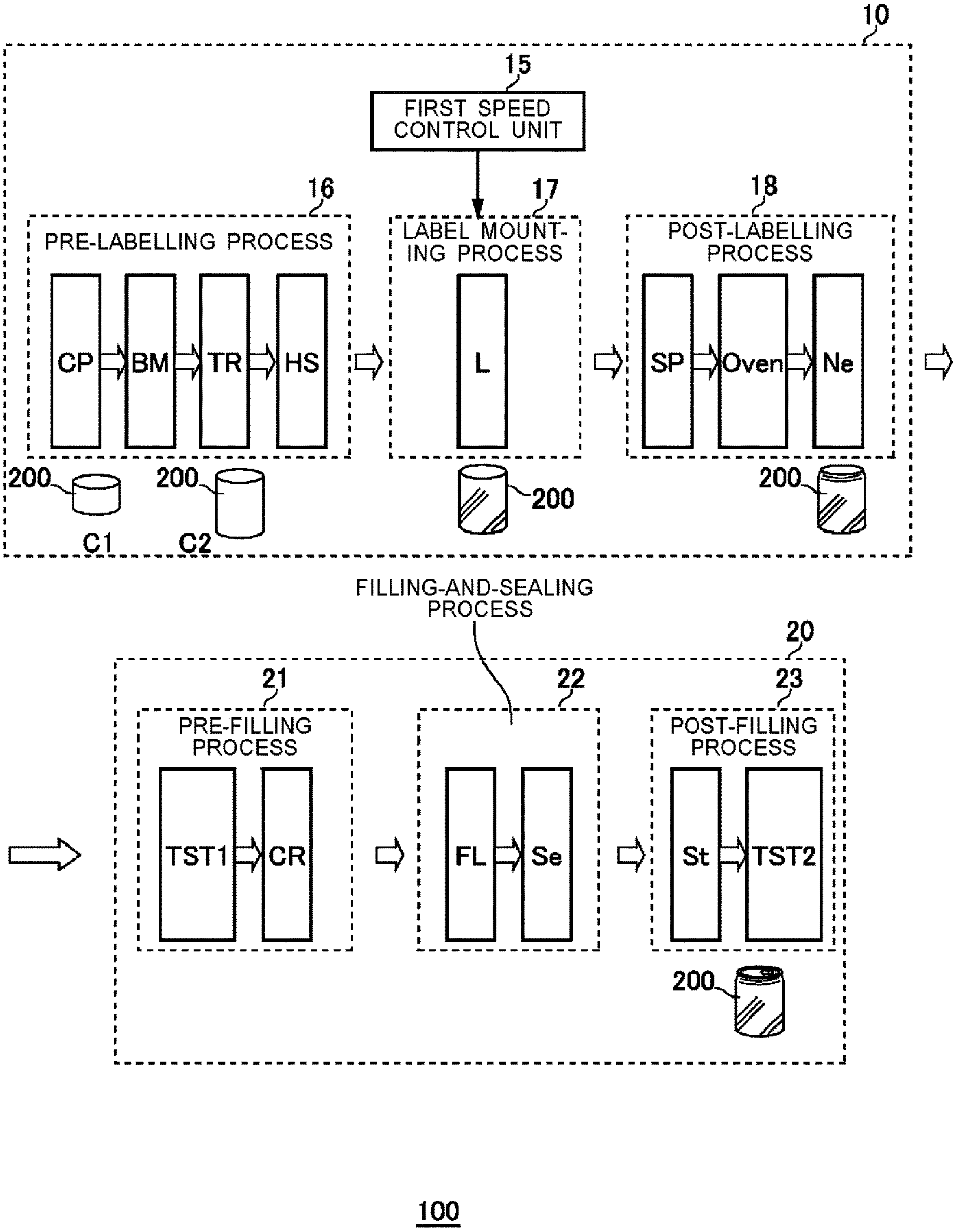
FIG. 8 illustrates a variant example of the manufacturing system 100 for manufacturing a labelled container.

FIG. 8 illustrates a variant example of the manufacturing system 100 for manufacturing a labelled container. A container 200 of the present example is a labelled container made by mounting a label printed with any image on a container. The container 200 may be a labelled can made by mounting the label on a metal can.

A container manufacturing line 10 includes a pre-labelling process 16, a label mounting process 17, and a post-labelling process 18. The pre-labelling process 16 and the post-labelling process 18 may include processes similar to those of the pre-printing process 11 and the post-printing process 13 in another example. In a case of the labelled container, there may be no need for the container manufacturing line 10 to include a printing process 12, but the printing process 12 can be included in addition to the label mounting process 17.

The label mounting process 17 includes a labelling process (L) for mounting the label printed with any image on the container 200. A type of the label may be any label type including a shrink sleeve label, stretch sleeve label, roll label, adhesive label, and the like. The label mounting process 17 is provided between the pre-labelling process 16 and the post-labelling process 18, but the label mounting process 17 can be provided after a necking process (Ne) of the post-labelling process 18 instead.

Alternatively, the label mounting process 17 may be provided in a filling line 20. The label mounting process 17 may be provided before a pre-filling inspection process (TST1) of a pre-filling process 21, provided in any process between a sealing process (Se) and a post-filling inspection process (TST2), or provided after the post-filling inspection process (TST2).

A first speed control unit 15 may control a manufacturing line speed by adjusting a speed of the label mounting process 17 depending on a filling line speed of the filling line 20. Alternatively, the first speed control unit 15 may control the manufacturing line speed by adjusting a speed of a process other than the label mounting process 17. Note that, the container manufacturing line 10 of the present example may appropriately be used in combination with the manufacturing system 100 of another example. The manufacturing system 100 may be used in combination with a second speed control unit 25, or used in combination with the first speed control unit 15 and the second speed control unit 25.

Figure 9:
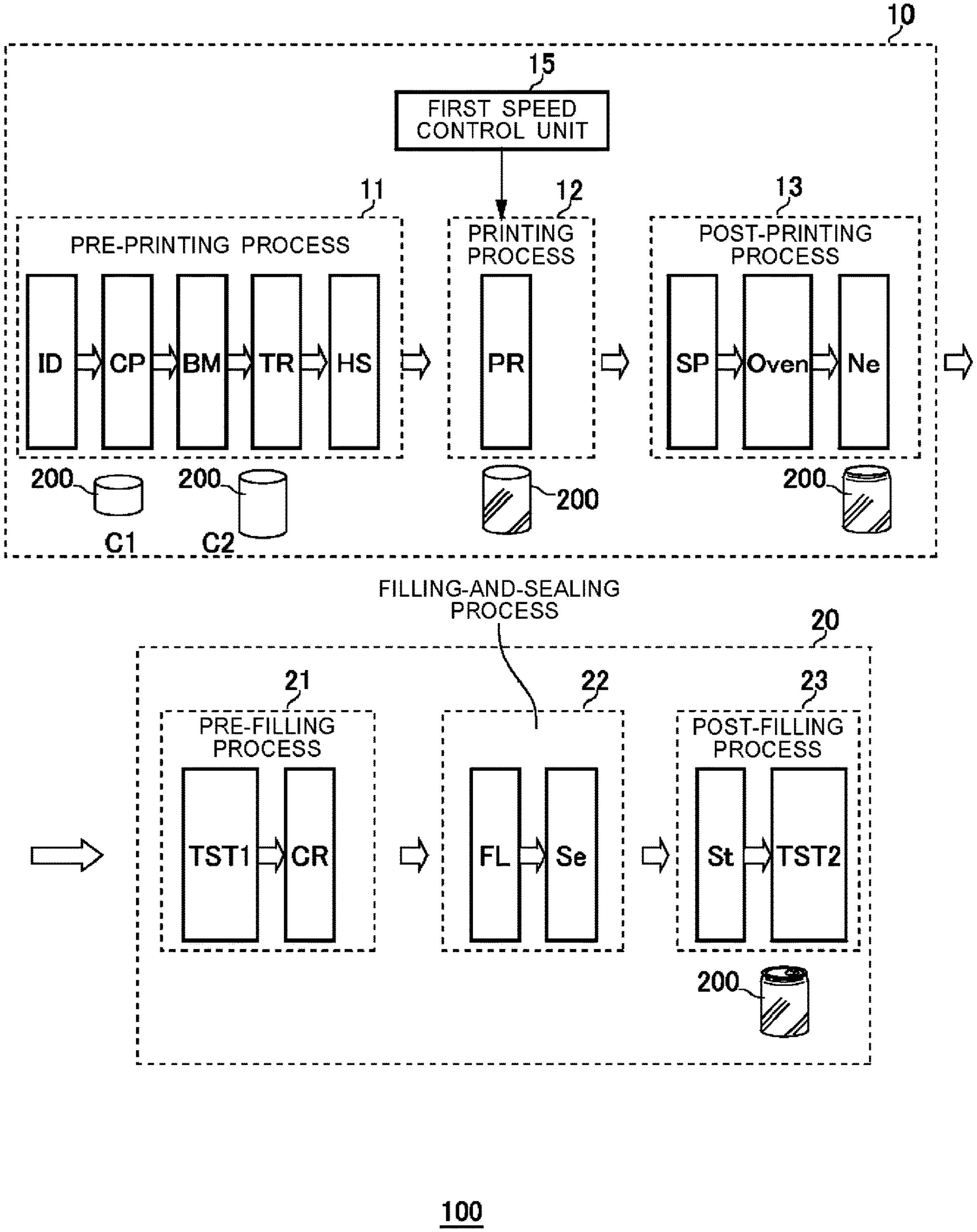
FIG. 9 illustrates a variant example of the manufacturing system 100.

FIG. 9 illustrates a variant example of the manufacturing system 100. A manufacturing system 100 of the present example includes an identification information providing process (ID) in a pre-printing process 11. In the identification information providing process (ID), individual identification information ID for identifying an individual container 200 is provided. The individual identification information ID may be used for identifying an individual container 200 in each process of the manufacturing system 100. A filling line 20 of the present example is configured to identify a container 200 by using the individual identification information ID provided by the container manufacturing line 10. In this manner, there is no need to provide the individual identification information ID in the filling line 20.

The identification information providing process (ID) has been provided before a cupping-press process (CP), but a position of the identification information providing process (ID) is not limited to this position. For example, the identification information providing process (ID) may be provided after a cupping-press process (CP), a body maker process (BM), or a trimmer process (TR). In the identification information providing process (ID) of the present example, the individual identification information ID is provided to a coil to be punched, but the individual identification information ID can be provided to a container 200 that has been punched instead.

The manufacturing system 100 of the present example can share the individual identification information ID between the container manufacturing line 10 and the filling line 20, and control a manufacturing line speed. By using the shared individual identification information ID, the individual container 200 can be easily managed throughout the manufacturing system 100, and it becomes easier to control a line speed.

While the embodiments of the present invention have been described, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

Note that the operations, procedures, steps, stages, etc. of each processing performed by a machine, system, program, and method shown in the claims, specification, or diagrams can be performed in any order as long as the order is not indicated by "prior to," "before," or the like and as long as the output from previous processing is not used in later processing. Even if an operation flow is described using phrases such as "first" or "next" in the claims, specification, or diagrams, it does not necessarily mean that the processing must be performed in this order.

EXPLANATION OF REFERENCES

10: container manufacturing line; 11: pre-printing process; 12: printing process; 13: post-printing process; 15: first speed control unit; 16: pre-labelling process; 17: label mounting process; 18: post-labelling process; 20: filling line; 21: pre-filling process; 22: filling-and-sealing process; 23: post-filling process; 25: second speed control unit; 30: reserve material manufacturing line; 35: third speed control unit; 100: manufacturing system; 110: line coupling unit; 112: in-line accumulator; 120: off-line accumulator; 130: distribution machine; 150: partition unit; 200: container; 210: reserve material; 300: factory.

What is claimed is:

1. A manufacturing system, comprising:

a container manufacturing line for manufacturing a container;

a filling line for filling the container with a filler;

a first accumulation process for accumulating the containers between the container manufacturing line and a filling-and-sealing process of the filling line; and a second accumulation process, which is for accumulating the containers between the container manufacturing line and the filling-and-sealing process, and which has accumulation capacity larger than that of the first accumulation process, wherein the container manufacturing line is coupled to the filling line, and the container manufactured in the container manufacturing line is supplied to the filling line, the second accumulation process becomes a place of accumulation when the manufacturing line speed of the container manufacturing line is faster than the filling line speed of the filling line, and a number of the containers in the filling line exceeds a predetermined percentage to capacity of the filling line, and a predetermined percentage to accumulation capacity of the first accumulation process;

the first accumulation process is an in the line process in which the container manufacturing line and the filling line are connected; and the second accumulation process is an out-of the line process in which the container manufacturing line and the filling line are connected.

2. The manufacturing system according to claim 1, wherein:

the container manufacturing line includes a first speed control unit for controlling a manufacturing line speed depending on a filling line speed of the filling line, the filling line includes a second speed control unit for controlling the filling line speed depending on the manufacturing line speed of the container manufacturing line, and the first speed control unit is configured to change the manufacturing line speed of the container manufacturing line, depending on a change in a number of containers, each being identical to the container, in a predetermined process in the filling line, or such that the manufacturing line speed corresponds with the filling line speed.

3. The manufacturing system according to claim 2, wherein the first speed control unit is configured to switch between a first manufacturing line speed that corresponds to the filling line speed, and a second manufacturing line speed that is faster than the first manufacturing line speed.

4. The manufacturing system according to claim 1, wherein:

the container manufacturing line includes a first speed control unit for controlling a manufacturing line speed depending on a filling line speed of the filling line, the filling line includes a second speed control unit for controlling the filling line speed depending on the manufacturing line speed of the container manufacturing line, and the second speed control unit is configured to adjust the filling line speed such that the filling line speed corresponds with the manufacturing line speed of the container manufacturing line.

5. The manufacturing system according to claim 1, wherein an overall line speed in the container manufacturing line and the filling line is maintained at a constant speed by changing at least one of the manufacturing line speed of the container manufacturing line or the filling line speed of the filling line.

6. The manufacturing system according to claim 1, wherein the filling line becomes a place of distribution when a ratio of the filling line speed of the filling line to the manufacturing line speed of the container manufacturing line is from 0.25 to 1.80.

7. The manufacturing system according to claim 1, comprising:

the first accumulation process becomes a place of distribution when the manufacturing line speed of the container manufacturing line is faster than the filling line speed of the filling line, and a number of the containers in the filling line exceeds a predetermined percentage to capacity of the filling line.

8. The manufacturing system according to claim 1, wherein a place of distribution for the containers which come from the container manufacturing line is decided depending on line pausing time for the container manufacturing line and the filling line.

9. The manufacturing system according to claim 1, comprising:

a partition unit for surrounding a predetermined process, wherein the partition unit is provided in at least some process among processes of the container manufacturing line.

10. The manufacturing system according to claim 9, wherein the partition unit is configured to provide a cleanliness class different that of another process.

11. The manufacturing system according to claim 1, comprising:

an inspection process between the container manufacturing line and the filling-and-sealing process of the filling line.

12. The manufacturing system according to claim 1, comprising:

a reserve material manufacturing line, which is provided upstream from the container manufacturing line, and is for manufacturing a reserve material for manufacturing the container, wherein the reserve material manufacturing line is coupled to the container manufacturing line, and the reserve material manufactured in the reserve material manufacturing line is supplied to the container manufacturing line.

13. The manufacturing system according to claim 12, wherein:

the container manufacturing line includes a first speed control unit for controlling a manufacturing line speed depending on a filling line speed of the filling line, the filling line includes a second speed control unit for controlling the filling line speed depending on the manufacturing line speed of the container manufacturing line, and the reserve material manufacturing line includes a third speed control unit for controlling a reserve material manufacturing line speed depending on a manufacturing line speed of the container manufacturing line and a filling line speed of the filling line.

14. The manufacturing system according to claim 12, wherein a cleanliness class of the reserve material manufacturing line is higher than a cleanliness class of the container manufacturing line.

15. The manufacturing system according to claim 1, wherein the container is a metal can.

16. The manufacturing system according to claim 1, wherein the container manufacturing line or the filling line includes a label mounting process for mounting a printed label on the container.

17. The manufacturing system according to claim 1, wherein the container manufacturing line includes an identification information providing process for providing individual identification information for identifying an individual container among the containers, and the filling line is configured to identify the containers by using the individual identification information.

18. A manufacturing system, comprising:

a container manufacturing line for manufacturing a container;

a filling line for filling the container with a filler;

a first accumulation process for accumulating the containers between the container manufacturing line and a filling-and-sealing process of the filling line; and a second accumulation process, which is for accumulating the containers between the container manufacturing line and the filling-and-sealing process, and which has accumulation capacity larger than that of the first accumulation process, wherein the container manufacturing line is coupled to the filling line, and the container manufactured in the container manufacturing line is supplied to the filling line, the second accumulation process becomes a place of accumulation when the manufacturing line speed of the container manufacturing line is faster than the filling line speed of the filling line, and a number of the containers in the filling line exceeds a predetermined percentage to capacity of the filling line, and a predetermined percentage to accumulation capacity of the first accumulation process; and the first accumulation process becomes a place of distribution when the manufacturing line speed of the container manufacturing line is faster than the filling line speed of the filling line, and a number of the containers in the filling line exceeds a predetermined percentage to capacity of the filling line.

* * * * *